(12) United States Patent
Nomura et al.

(10) Patent No.: US 6,853,500 B2
(45) Date of Patent: Feb. 8, 2005

(54) RETRACTING MECHANISM OF A ZOOM LENS BARREL

(75) Inventors: Hiroshi Nomura, Saitama (JP);
Yoshihiro Yamazaki, Saitama (JP);
Isao Okuda, Saitama (JP)

(73) Assignee: PENTAX Corporation, Tokyo (JP)

( * ) Notice: Subject to any disclaimer, the term of this patent is extended or adjusted under 35 U.S.C. 154(b) by 0 days.

(21) Appl. No.: 10/776,238

(22) Filed: Feb. 12, 2004

(65) Prior Publication Data

US 2004/0160679 A1 Aug. 19, 2004

(30) Foreign Application Priority Data

Feb. 13, 2003 (JP) ........................................ 2003-034959

(51) Int. Cl.[7] .............................................. G02B 15/14
(52) U.S. Cl. ...................... 359/695; 359/700; 359/701; 359/702
(58) Field of Search ................................ 359/694–695, 359/699–702, 823

(56) References Cited

U.S. PATENT DOCUMENTS

| 5,488,513 | A | 1/1996 | Tanaka |
| 5,589,987 | A | 12/1996 | Tanaka |
| 6,469,840 | B2 | 10/2002 | Nomura et al. |
| 2003/0007796 | A1 | 1/2003 | Nomura et al. |
| 2004/0042089 | A1 | 3/2004 | Nomura |
| 2004/0042777 | A1 | 3/2004 | Nomura |
| 2004/0051971 | A1 | 3/2004 | Nomura |
| 2004/0156122 | A1 * | 8/2004 | Nomura et al. ............. 359/694 |
| 2004/0156123 | A1 * | 8/2004 | Nomura et al. ............. 359/699 |
| 2004/0156127 | A1 * | 8/2004 | Nomura et al. ............. 359/821 |
| 2004/0156181 | A1 * | 8/2004 | Nomura et al. ............... 362/18 |
| 2004/0160678 | A1 * | 8/2004 | Nomura et al. ............. 359/701 |
| 2004/0160683 | A1 * | 8/2004 | Nomura et al. ............. 359/819 |

FOREIGN PATENT DOCUMENTS

| JP | 10-282394 | 10/1998 |
| JP | 2001-215385 | 8/2001 |
| JP | 2003-021775 | 1/2003 |

* cited by examiner

*Primary Examiner*—Ricky Mack
(74) *Attorney, Agent, or Firm*—Greenblum & Bernstein, P.L.C.

(57) ABSTRACT

A retracting mechanism of a zoom lens barrel includes a first through third lens group moving rings; a first linear guide projection formed on the first lens group moving ring to be engaged in a linear guide slot from outside the second lens group moving ring, the first linear guide projection including a hanging groove formed therealong, a rear end of the hanging groove being closed; a second linear guide projection formed on the third lens group moving ring to be engaged in the linear guide slot from inside the second lens group moving ring; and a linear moving key projecting from a front end of the second linear guide projection to be engaged in the hanging groove. A rear moving limit of the third lens group moving ring is determined by contact of the linear moving key with the closed end of the hanging groove.

7 Claims, 19 Drawing Sheets

RETRACTING MECHANISM OF A ZOOM LENS BARREL

BACKGROUND OF THE INVENTION

1. Field of the Invention

The present invention relates to a retracting mechanism of a zoom lens barrel.

2. Description of the Related Art

A zoom lens system including a first lens group, a second lens group and a third lens group in that order from the object side, wherein the first lens group and the third lens group are integrally moved along an optical axis during a variation of a focal length, is known in the art. A retractable zoom lens barrel including such a type of zoom lens system, wherein a integral movement relationship between the first lens group and the third lens group is canceled to bring the first lens group close to the second and third lens groups to reduce the length of the zoom lens barrel when it is retracted to a retracted position (full-retracted position or a power-off position), is also known in the art. In general, a compression coil spring for biasing the second lens group and the third lens group in opposite directions away from each other is installed therebetween so that the third lens group is moved rearward to its rear moving limit relative to the first lens group by the spring force of the compression coil spring to establish the aforementioned integral movement relationship between the first lens group and the third lens group when the focal length of the zoom lens system is varied (when the zoom lens barrel is in a ready-to-photograph state), and so that the third lens group is brought close to the second lens group (and the first lens group) by compressing the compression coil spring when the zoom lens barrel is retracted to the retracted position.

Such a conventional zoom lens barrel is usually provided with a moving ring which supports the third lens group and is guided along the optical axis of the zoom lens system, and is further provided between the moving ring and another element of the zoom lens barrel with a linear guide mechanism for guiding the moving ring linearly along the optical axis. If an excessive load is applied to the moving ring, an engagement of the moving ring with the another element of the zoom lens barrel through the linear guide mechanism is disengaged, which may cause the moving ring from coming off the zoom lens barrel.

A solution to this problem is to increase the strength of the linear guide mechanism by forming the linear guide mechanism so as to have a complicated structure. However, if the linear guide mechanism is complicated, it will be difficult to install the movable ring into the zoom lens barrel during assembly.

SUMMARY OF THE INVENTION

The present invention provides a retracting mechanism of a zoom lens barrel including the aforementioned type of zoom lens system, in which the first lens group and the third lens group are moved together as one body along an optical axis during a variation of a focal length, wherein the retracting mechanism can be easily assembled, and wherein each of the first, second and third lens groups can be linearly guided with reliability.

According to an aspect of the present invention, a retracting mechanism of a zoom lens barrel is provided, including a first lens group, a second lens group and a third lens group, in that order from an object side, wherein the first lens group and the third lens group are integrally moved along an optical axis thereof during a zooming operation, and wherein at least one of the first lens group and the third lens group is moved relative to the other to reduce a distance therebetween when the zoom lens barrel is retracted, the retracting mechanism including a first lens group moving ring which is linearly guided along the optical axis, and supports the first lens group; a second lens group moving ring which is linearly guided along the optical axis, and supports the second lens group; a third lens group moving ring which is linearly guided along the optical axis, and supports the third lens group, the third lens group moving ring being allowed to freely approach the first lens group moving ring while being prevented from moving away from the first lens group moving ring beyond a moving limit relative to the first lens group moving ring; a cam mechanism for moving the first lens group moving ring and the second lens group moving ring in respective moving manners independent of each other along the optical axis; a biasing device for biasing the third lens group moving ring in a direction away from the first lens group moving ring; a linear guide through-slot formed on the second lens group moving ring to be elongated in a direction parallel to the optical axis; a first linear guide projection formed on the first lens group moving ring to be engaged in the linear guide through-slot from outside the second lens group moving ring, the first linear guide projection including a hanging groove formed along a substantially center thereof and elongated in a direction parallel to the optical axis, a rear end of the hanging groove being closed; a second linear guide projection formed on the third lens group moving ring to be engaged in the linear guide through-slot from inside the second lens group moving ring; and a linear moving key projecting from a front end of the second linear guide projection to be engaged in the hanging groove. A rear moving limit of the third lens group moving ring relative to the first lens group moving ring is determined by contact of the linear moving key with the closed rear end of the hanging groove.

It is desirable for the hanging groove to include a narrow-width groove portion which communicatively connects with the linear guide through-slot; and a wide-width groove portion which communicative connects with the narrow-width groove portion, a width of the wide-width groove portion in a circumferential direction of the first lens group moving ring being greater than that of the narrow-width groove portion. It is desirable for the linear moving key to include a neck portion which is engaged in the narrow-width groove portion; and a head portion which is engaged in the wide-width groove portion, a width of the head portion in a circumferential direction of the first lens group moving ring being greater than that of the neck portion.

It is desirable for the second lens group moving ring to include a follower introducing through-slot which extends orthogonal to the linear guide through-slot to communicatively connect with the linear guide through-slot; and a first follower introducing groove which extends parallel to the optical axis to communicative connect with the follower introducing through-slot, a front end of the first follower introducing groove communicatively connecting with the follower introducing through-slot, a rear end of the first follower introducing groove being open on a rear surface of the second lens group moving ring. The first lens group moving ring includes a second follower introducing groove which radially communicatively connects with the follower introducing through-slot and the hanging groove when the first lens group moving ring is positioned at a specific position relative to the second lens group moving ring in the optical axis direction. The linear moving key is inserted into the hanging groove via the follower introducing through-slot, the first follower introducing groove and the second follower introducing groove during assembly of the zoom lens barrel.

It is desirable for the first lens group moving ring, the second lens group moving ring and the third lens group moving ring to be coaxially arranged so that the first lens group moving ring is positioned around the second lens group moving ring, and so that the second lens group moving ring is positioned around the third lens group moving ring.

It is desirable for the cam mechanism to include a cam ring which is positioned around the second lens group moving ring to be rotatable relative to the second lens group moving ring, and includes a plurality of outer cam grooves formed on an outer peripheral surface of the cam ring, and a plurality of inner cam grooves formed on an inner peripheral surface of the cam ring; a plurality of inward cam followers which project radially inwards from the first lens group moving ring to be engaged in the plurality of outer cam grooves, respectively; and a plurality of outward cam followers which project radially outwards from the second lens group moving ring to be engaged in the plurality of inner cam grooves, respectively.

It is desirable for the biasing device to be a compression coil spring.

It is desirable for positions of the first lens group moving ring and the second lens group moving ring in the optical axis direction to be adjustable by rotating the cam ring to make the second follower introducing groove and the follower introducing through-slot aligned in the optical axis direction so that the second follower introducing grooves, the follower introducing through-slots and the first follower introducing grooves form an L-shaped follower introducing channel, through which the linear moving key is inserted into the hanging groove, when the third lens group moving ring is installed in the zoom lens barrel during assembly.

The present disclosure relates to subject matter contained in Japanese Patent Application No. 2003-034959 (filed on Feb. 13, 2003) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENT

Figure 1:
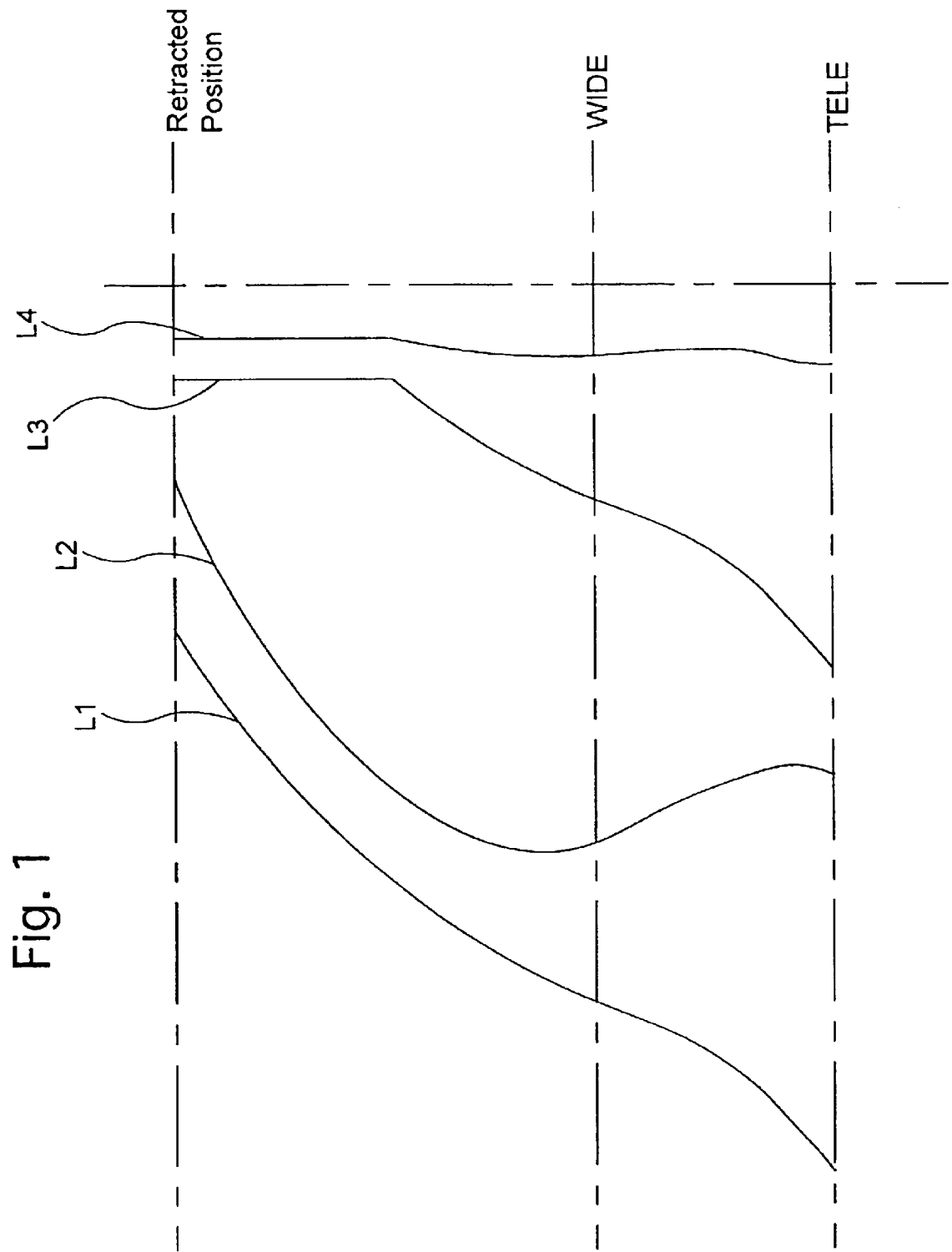
FIG. 1 is a diagram showing reference moving paths of zoom lens groups of a zoom lens system provided in an embodiment of a zoom lens barrel according to the present invention.
Figure 2:
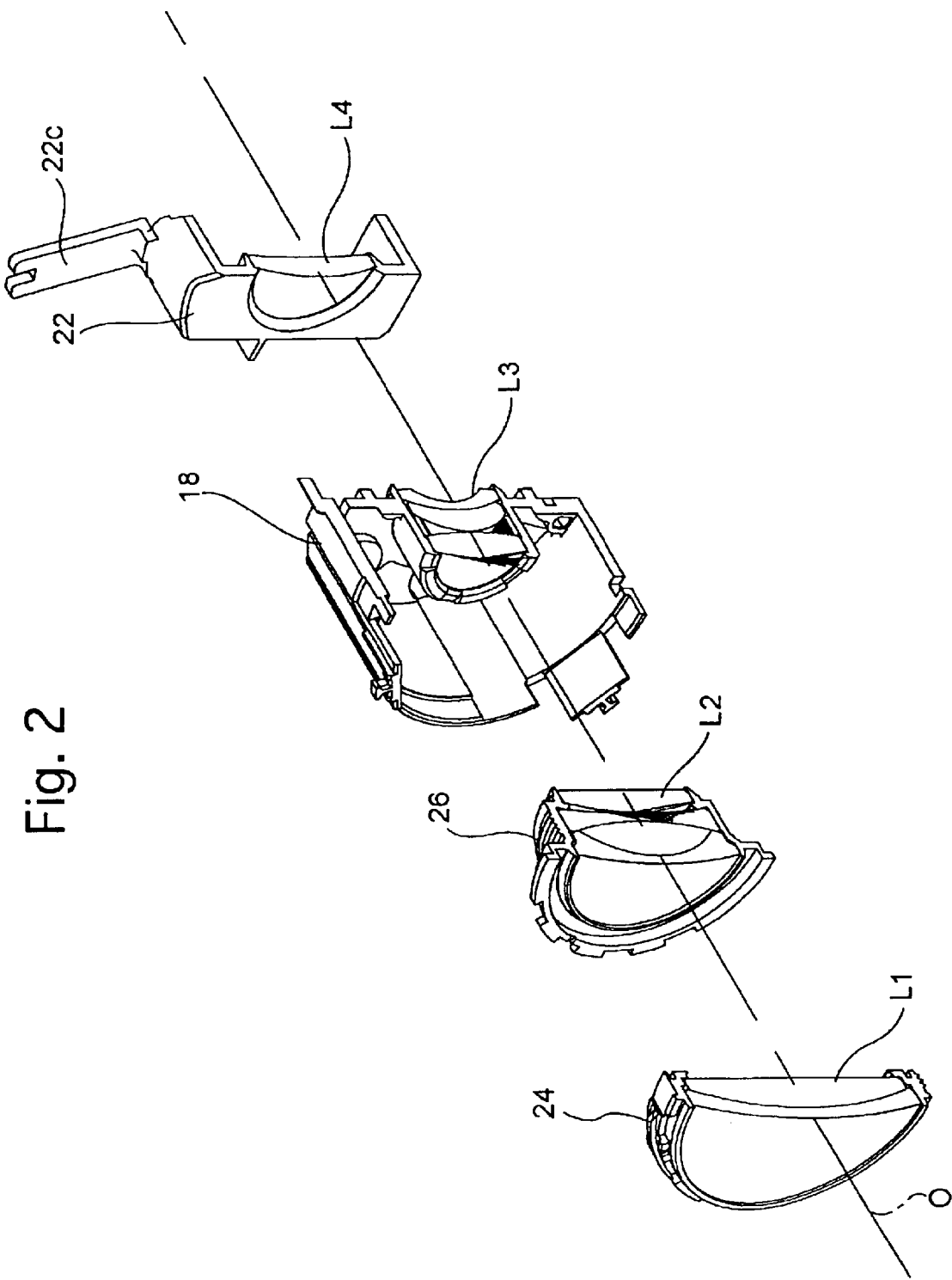
FIG. 2 is an exploded perspective view in axial section of the zoom lens groups and lens support frames therefor.

First of all, a zoom lens system (zoom lens optical system) provided in an embodiment of a zoom lens barrel of a camera according to the present invention will be hereinafter discussed with reference to FIGS. 1 through 5. The zoom lens system of the zoom lens barrel 10 is a vari-focal lens system consisting of four lens groups: a positive first lens group L1, a negative second lens group L2, a positive third lens group L3 and a positive fourth lens group L4, in that order from the object side (left side as viewed in FIG. 3). The first through third lens groups L1, L2 and L3 are moved relative to one another along an optical axis O to vary the focal length of the zoom lens system and the fourth lens group L4 is moved along the optical axis O to make a slight focus adjustment, i.e., to adjust a slight focus deviation caused by the variation of the focal length. During the operation of varying the focal length of the zoom lens system between wide angle and telephoto, the first lens group L1 and the third lens group L3 move along the optical axis while maintaining the distance therebetween. The fourth lens group L4 also serves as a focusing lens group. FIG. 1 shows both moving paths of the first through fourth lens groups L1 through L4 during the zooming operation and moving paths for advancing/retracting operation. By definition, a vari-focal lens is one whose focal point slightly varies when varying the focal length, and a zoom lens is one whose focal point does not vary substantially when varying the focal length. However, the vari-focal lens system of the present invention is also hereinafter referred to as a zoom lens system.

Figure 8:
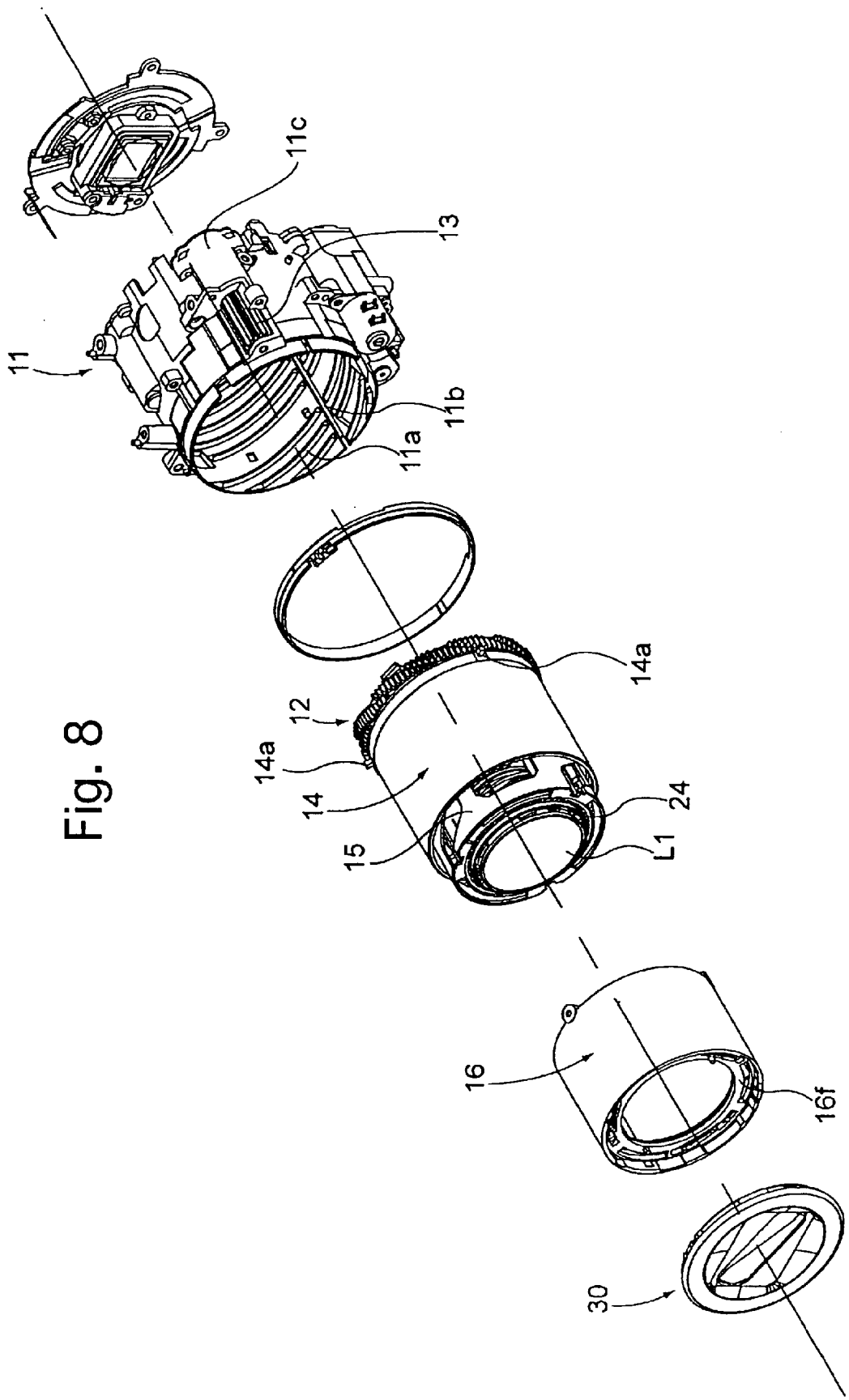
FIG. 8 is an exploded perspective view of a portion of the zoom lens barrel shown in FIG. 3.
Figure 9:
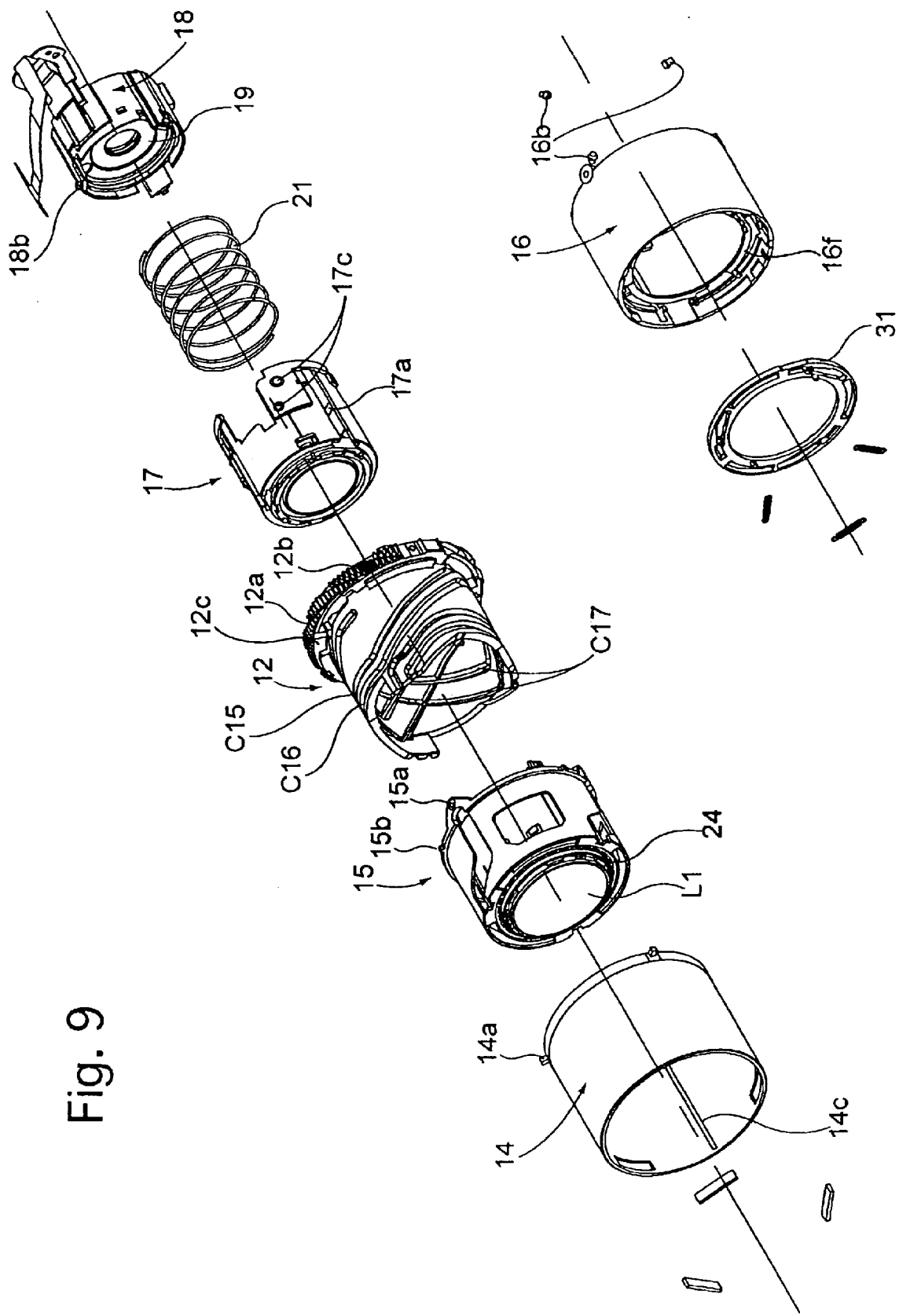
FIG. 9 is an exploded perspective view of a portion of the zoom lens barrel shown in FIG. 3.
Figure 10:
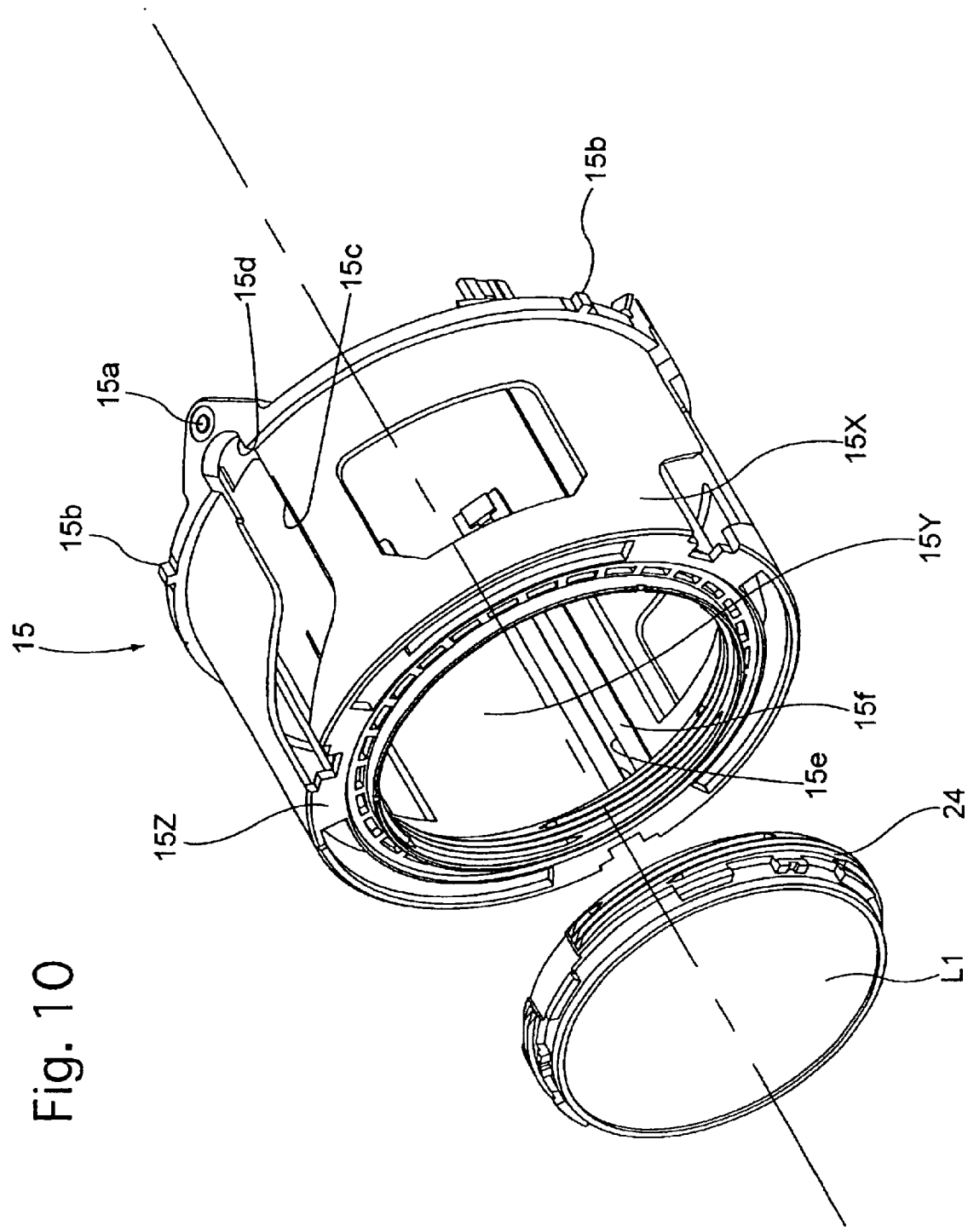
FIG. 10 is an exploded perspective view of a portion of the zoom lens barrel shown in FIG. 3, showing a first lens group moving ring and peripheral elements.
Figure 15:
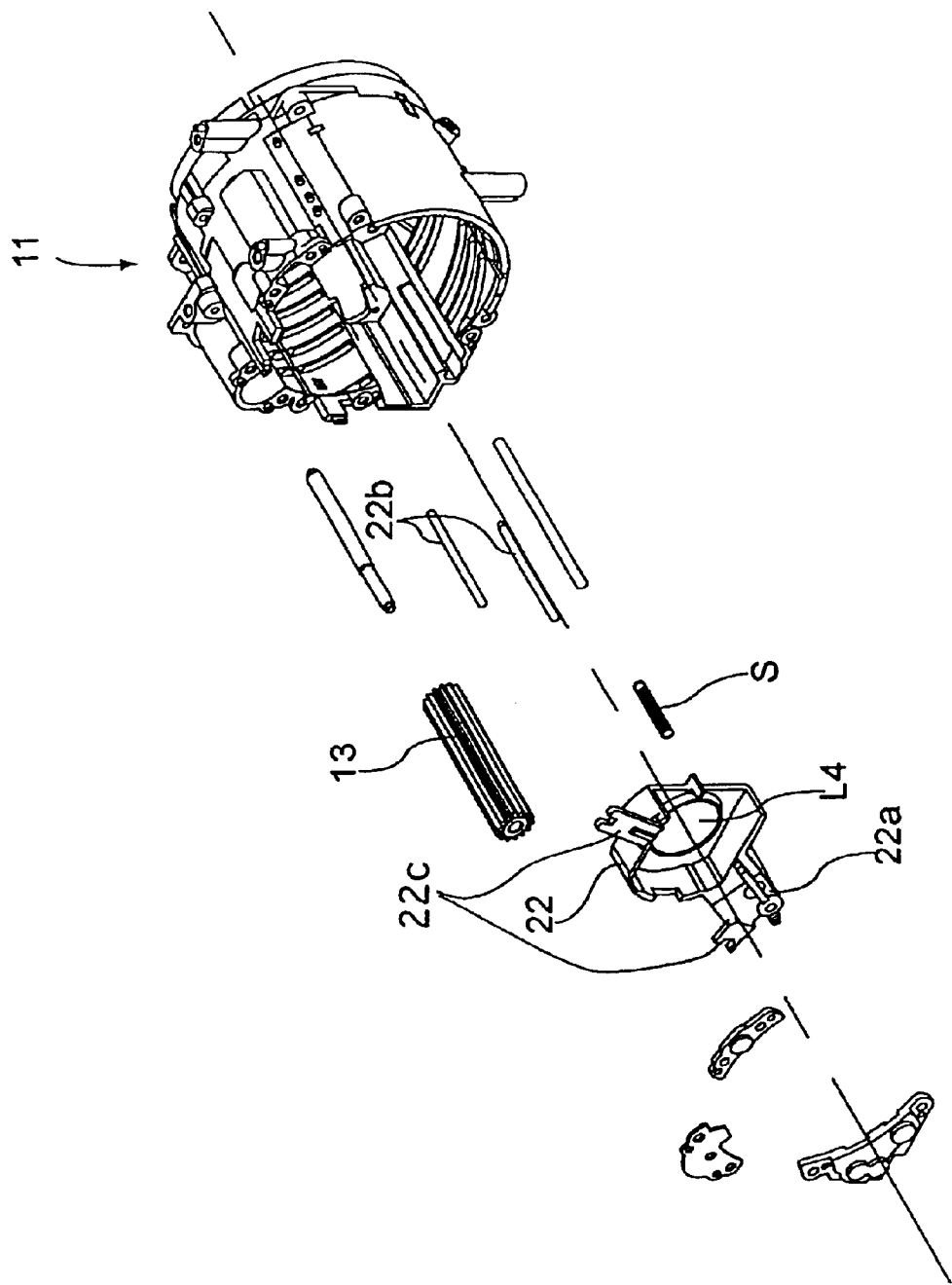
FIG. 15 is an exploded perspective view of a portion of the zoom lens barrel shown in FIG. 3, showing the stationary barrel, a fourth lens group and peripheral elements.

The overall structure of the zoom lens barrel 10 will be hereinafter discussed with reference to FIGS. 1 through 19. The zoom lens barrel 10 is provided with a stationary barrel 11 which is fixed to a camera body (not shown). As shown in FIG. 8, the stationary barrel 11 is provided on an inner peripheral surface thereof with a female helicoid 11a and a set of three linear guide grooves 11b which extend parallel to the optical axis O. The zoom lens barrel 10 is provided inside the stationary barrel 11 with a cam/helicoid ring (cam ring) 12. As shown in FIG. 9, the cam/helicoid ring 12 is provided, on an outer peripheral surface thereof in the vicinity of the rear end of the cam/helicoid ring 12, with a male helicoid 12a which is engaged with the female helicoid 11a of the stationary barrel 11. The cam/helicoid ring 12 is provided on the thread of the male helicoid 12a with a spur gear 12b which is always engaged with a drive pinion 13 (see FIG. 15). The drive pinion 13 is provided in a recessed portion 11c (see FIG. 3) formed on an inner peripheral surface of the stationary barrel 11. The drive pinion 13 is supported by the stationary barrel 11 to be freely rotatable in the recessed portion 11c on an axis of the drive pinion 13. Accordingly, forward and reverse rotations of the drive pinion 13 cause the cam/helicoid ring 12 to move forward rearward along the optical axis O while rotating about the optical axis O due to the engagement of the drive pinion 13 with the spur gear 12b and the engagement of the female helicoid 11a with the male helicoid 12a. In the present embodiment of the zoom lens barrel 10, the cam/helicoid ring 12 is the only element thereof which rotates about the optical axis O.

The zoom lens barrel 10 is provided around the cam/helicoid ring 12 with a linear guide ring 14. The linear guide ring 14 is provided, on an outer peripheral surface thereof at the rear end of the linear guide ring 14, with a set of three linear guide projections 14a which project radially outwards to be engaged in the set of three linear guide grooves 11b of the stationary barrel 11, respectively. The linear guide ring 14 is provided, on an inner peripheral surface thereof at the rear end of the linear guide ring 14, with a set of three bayonet lugs 14b (only one of them appears in FIGS. 1 through 4). The cam/helicoid ring 12 is provided, on an outer peripheral surface thereof immediately in front of the male helicoid 12a (the spur gear 12b), with a circumferential groove 12c in which the set of three bayonet lugs 14b are engaged to be rotatable about the optical axis O in the circumferential groove 12c. Accordingly, the linear guide ring 14 is linearly movable along the optical axis O together with the cam/helicoid ring 12 without rotating about the optical axis O.

Figure 4:
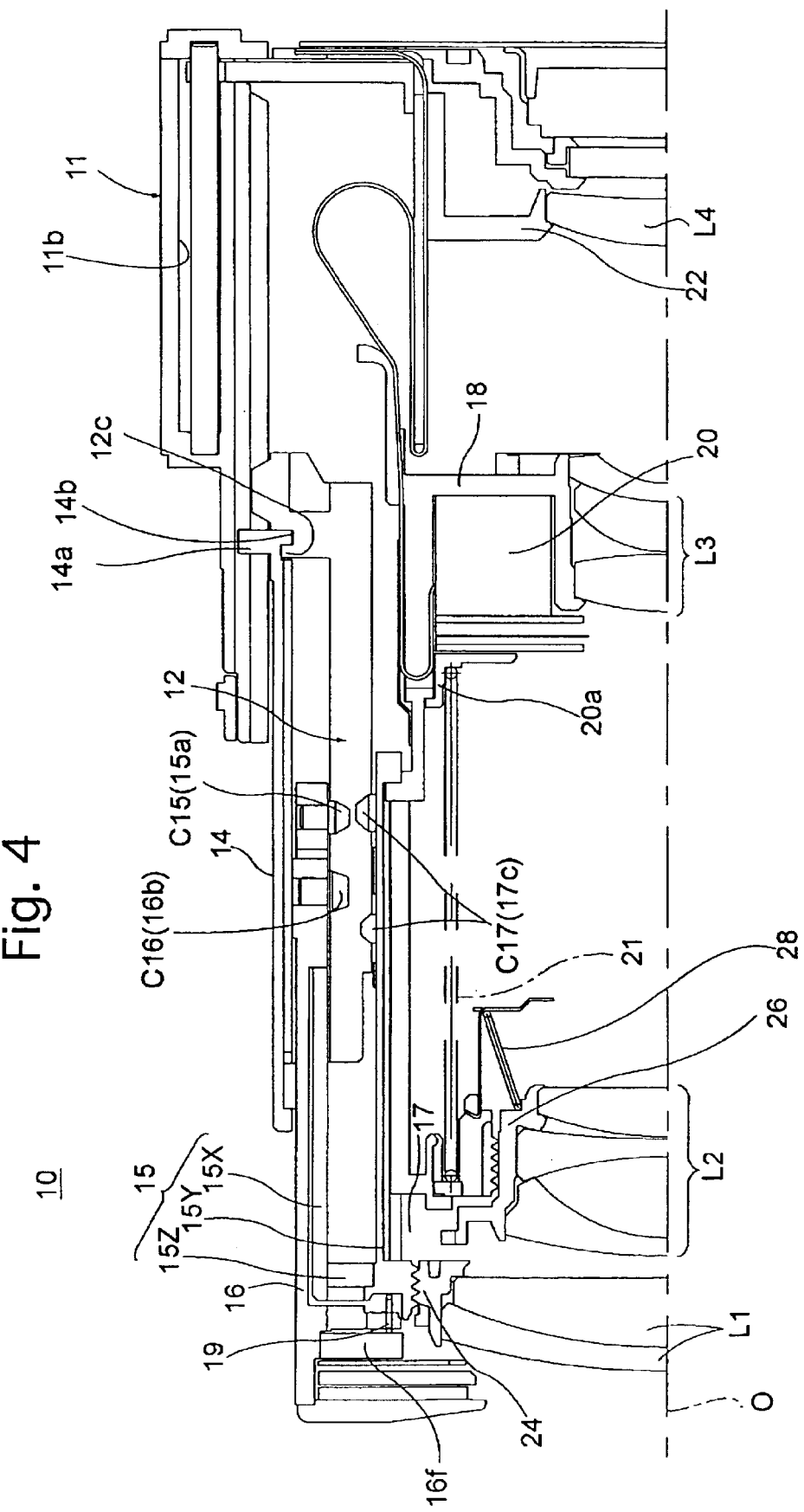
FIG. 4 is a view similar to that of FIG. 3, and shows an upper half of the zoom lens barrel from the optical axis thereof at the wide-angle extremity.
Figure 16:
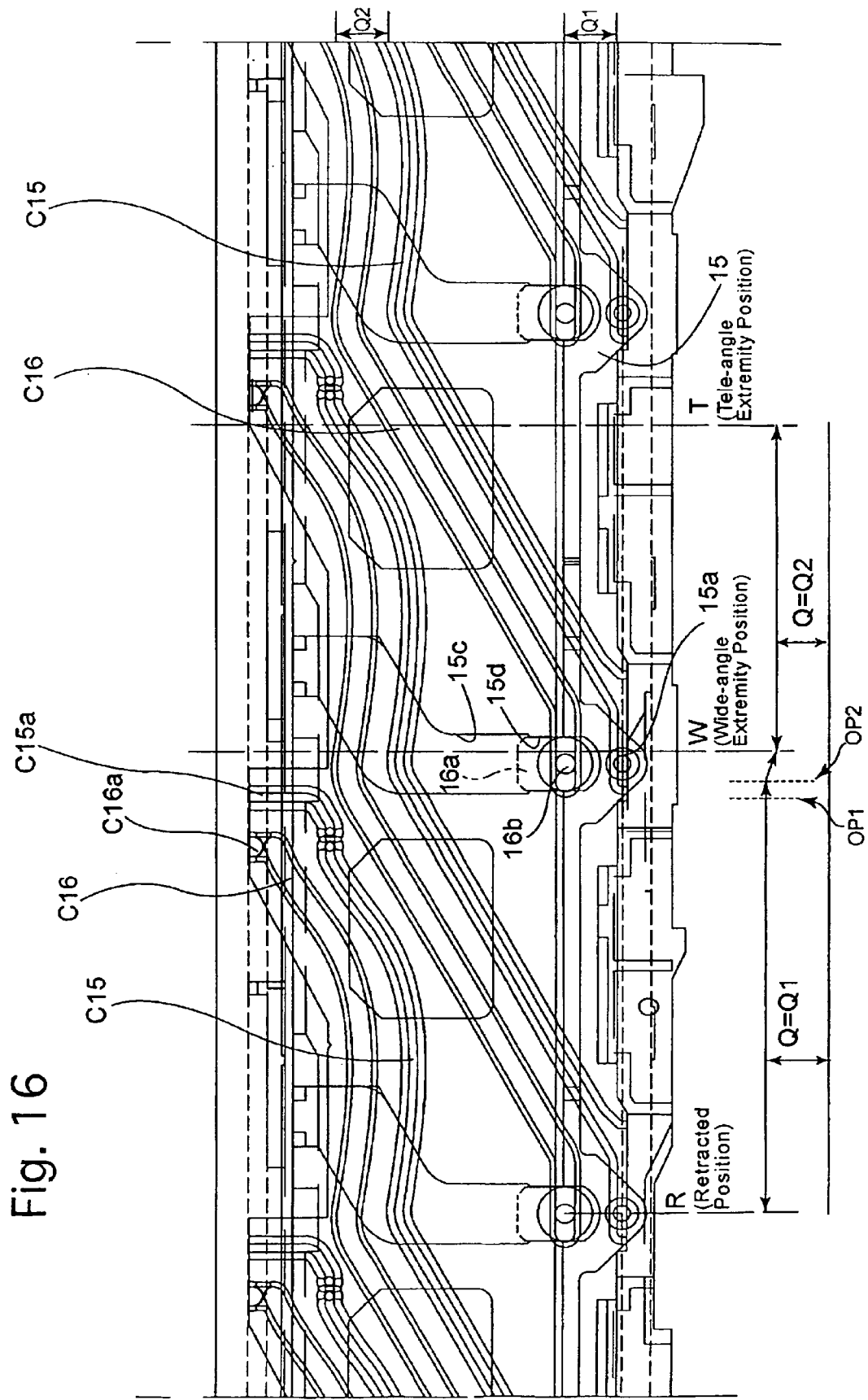
FIG. 16 is a developed view of a cam/helicoid ring, showing a set of first cam grooves of the cam/helicoid ring for moving the first lens group and a set of third cam grooves of the cam/helicoid ring for moving an exterior ring.

The zoom lens barrel 10 is provided around the cam/helicoid ring 12 with a first lens group moving ring (first lens frame) 15 which supports the first lens group L1, and is further provided around the first lens group moving ring 15 with an exterior ring 16 serving as a light shield member. The zoom lens barrel 10 is provided inside the cam/helicoid ring 12 with a second lens group moving ring (second lens frame) 17 which supports the second lens group L2. As shown in FIGS. 4, 9 and 16, the cam/helicoid ring 12 is provided on an outer peripheral surface thereof with a set of three first cam grooves C15 for moving the first lens group moving ring 15 and a set of three third cam grooves C16 for moving the exterior ring 16, and is further provided on an inner peripheral surface of the cam/helicoid ring 12 with a set of six second cam grooves C17 for moving the second lens group moving ring 17 (see FIG. 19). The set of three first cam grooves C15 and the set of three third cam grooves C16 are slightly different in shape, and are apart from one another at predetermined intervals in a circumferential direction of the cam/helicoid ring 12. The set of six second cam grooves C17 have the same basic cam diagrams, and includes three front second cam grooves C17, and three rear second cam grooves C17 which are positioned behind the three front second cam grooves C17 in the optical axis direction (vertical direction as viewed in FIG. 19), respectively; the three front second cam grooves C17 are apart from one another in a circumferential direction of the cam/helicoid ring 12 while the three rear second cam grooves C17 are apart from one another in a circumferential direction of the cam/helicoid ring 12. Each of the first lens group moving ring 15, the exterior ring 16 and the second lens group moving ring 17 is linearly guided along the optical axis O. A rotation of the cam/helicoid ring 12 causes the first lens group moving ring 15, the exterior ring 16 and the second lens group moving ring 17 to move along the optical axis O in accordance with the contours of the set of three first cam grooves C15, the set of three third cam grooves C16 and the set of six second cam grooves C17, respectively.

Figure 5:
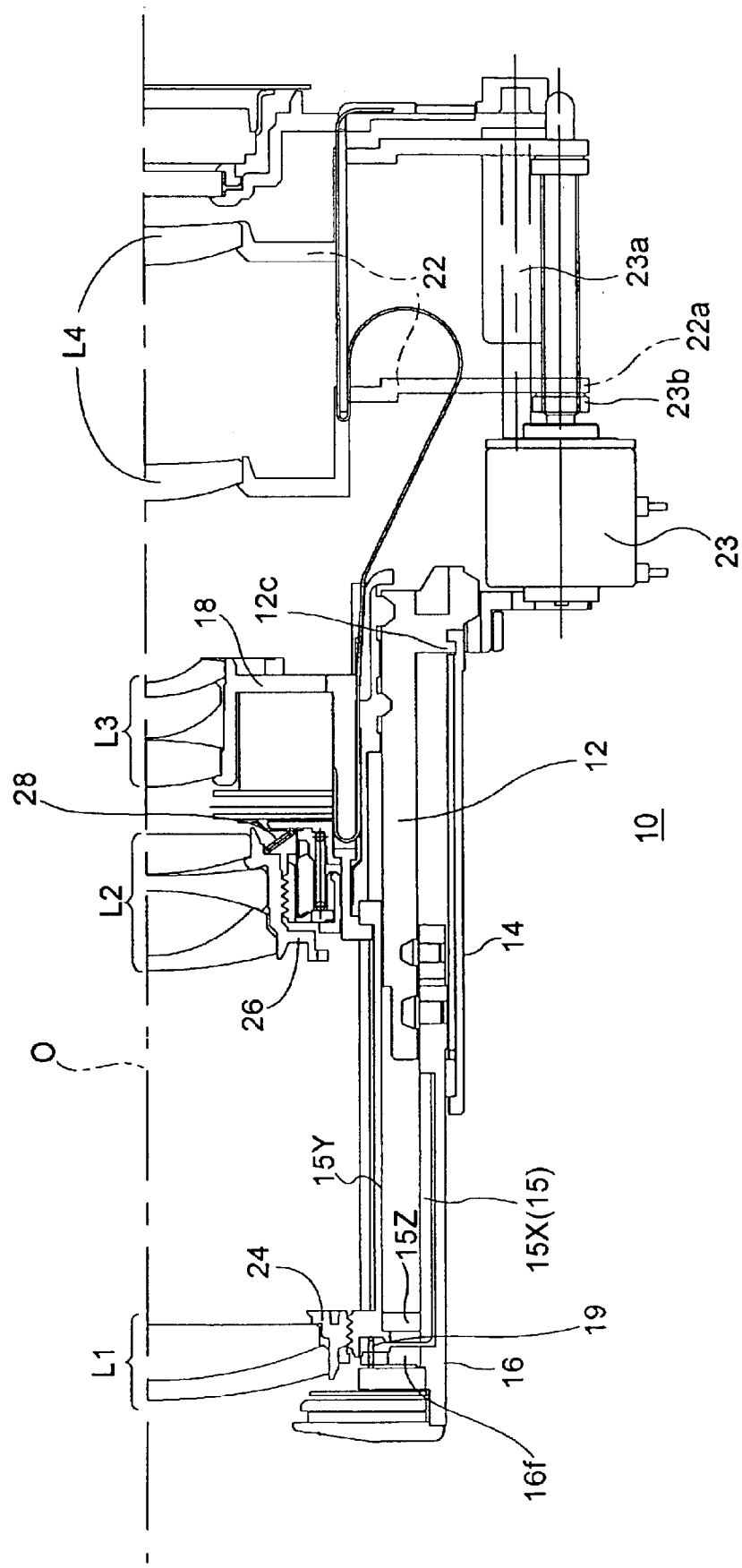
FIG. 5 is a view similar to that of FIG. 3, and shows a lower half of the zoom lens barrel from the optical axis thereof at the telephoto extremity.

Linear guide mechanical linkages among the first lens group moving ring 15, the exterior ring 16 and the second lens group moving ring 17 will be discussed hereinafter. As shown in FIGS. 4 and 5, the first lens group moving ring 15 is provided with an outer ring portion 15X, an inner ring portion 15Y and a flange wall 15Z by which the front end of the outer ring portion 15X and the front end of the inner ring portion 15Y are connected to have a substantially U-shaped cross section. The cam/helicoid ring 12 is positioned between the outer ring portion 15X and the inner ring portion 15Y. Three cam followers 15a which are respectively engaged in the set of three first cam grooves C15 are fixed to the outer ring portion 15X in the vicinity of the rear end thereof. The zoom lens barrel 10 is provided with a first lens group support frame 24 which supports the first lens group L1. As shown in FIGS. 8 and 9, the first lens group support frame 24 is fixed to the inner ring portion 15Y at the front end thereof through a male thread portion and a female thread portion which are formed on an outer peripheral surface of the first lens group support frame 24 and an inner peripheral surface of the inner ring portion 15Y, respectively (see FIG. 10). The first lens group support frame 24 can be rotated relative to the first lens group moving ring 15 to adjust the position of the first lens group support frame 24 along the optical axis O relative to the first lens group moving ring 15 to carry out a zooming adjustment (which is an adjustment operation which is carried out in a manufacturing process of the zoom lens barrel if necessary).

The linear guide ring 14, which is linearly guided along the optical axis O by the stationary barrel 11, is provided, on an inner peripheral surface thereof at approximately equiangular intervals (intervals of approximately 120 degrees), with a set of three linear guide grooves 14c (only one of them appears in FIG. 9), while the outer ring portion 15X of the first lens group moving ring 15 is provided at the rear end thereof with a set of three linear guide projections 15b (see FIG. 10) which project radially outwards to be engaged in the set of three linear guide grooves 14c, respectively. The outer ring portion 15X is provided with a set of three assembly slots 15c (see FIGS. 10 and 16), and is further provided at the rear ends of the set of three assembly slots 15c with a set of linear guide slots 15d which are communicatively connected with the set of three assembly slots 15c and are smaller in width than the set of three assembly slots 15c, respectively. Three linear guide keys 16a which are fixed to the exterior ring 16 which is positioned between the outer ring portion 15X and the linear guide ring 14 are engaged in the set of linear guide slots 15d, respectively. The maximum relative moving distance between the first lens group moving ring 15 and the exterior ring 16 along the optical axis O (the difference in shape between the set of three first cam grooves C15 and the set of three third cam grooves C16) is only a slight distance, and the length of each linear guide slot 15d in the optical axis direction is correspondingly short. A set of three cam followers 16b which are engaged in the set of three third cam grooves C16 are fixed to the set of three linear guide keys 16a, respectively (see FIGS. 7 and 9).

Figure 3:
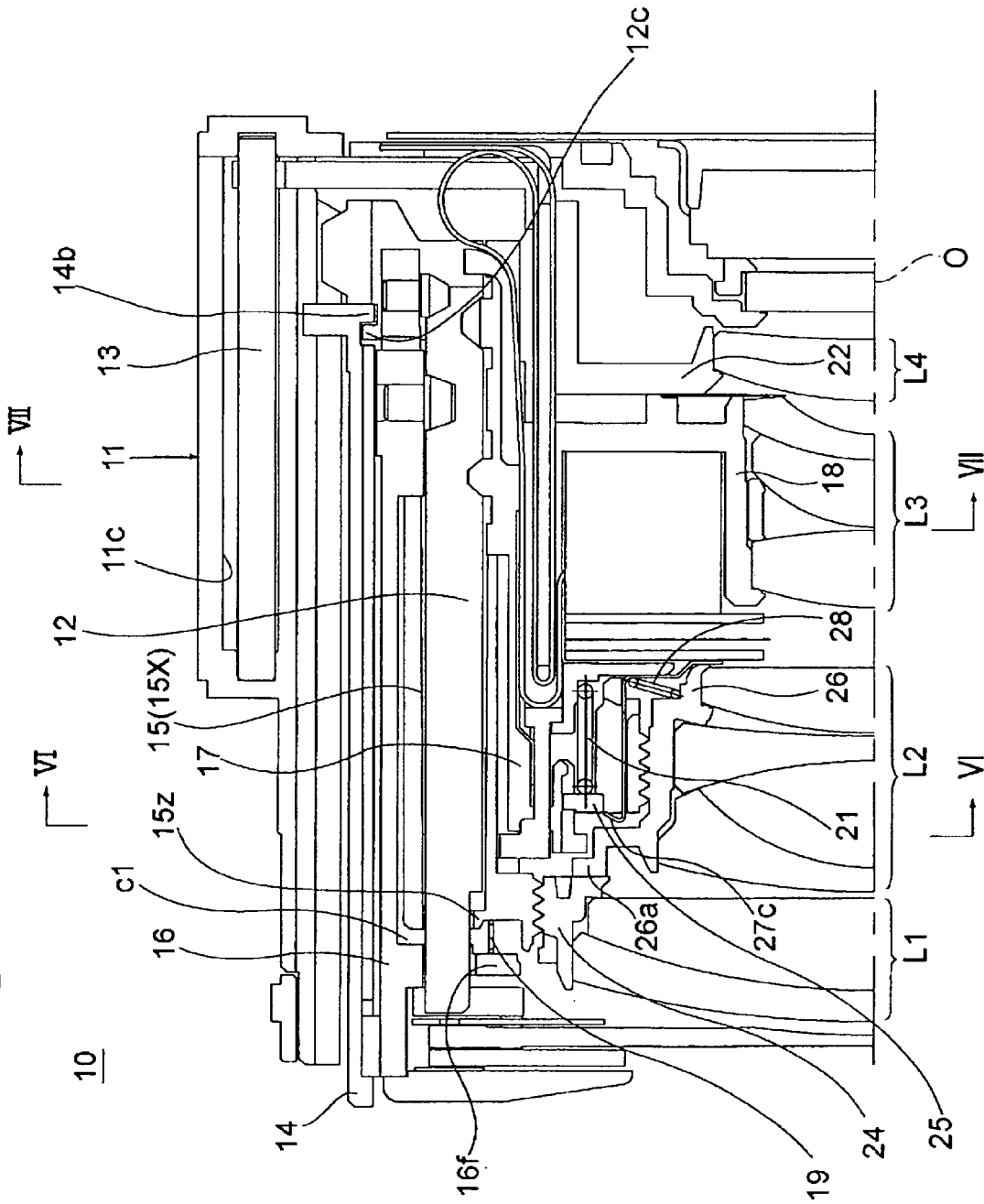
FIG. 3 is a longitudinal cross sectional view of the embodiment of the zoom lens barrel according to the present invention, showing an upper half of the zoom lens barrel from the optical axis thereof in a retracted state.

The zoom lens barrel 10 is provided between the first lens group moving ring 15 and the exterior ring 16 with a compression coil spring 19 (see FIGS. 3 through 5). The compression coil spring 19 biases the first lens group moving ring 15 rearward to remove backlash between the set of three first cam grooves C15 and the set of three cam followers 15a, and at the same time, biases the exterior ring 16 forward to remove backlash between the set of three third cam grooves C16 and the set of three cam followers 16b.

As shown in FIG. 16, the set of three first cam grooves C15 and the set of three third cam grooves C16 are shaped slightly different from each other in their respective retracting positions, as compared with their respective photographing ranges (zooming ranges), so that the exterior ring 16 advances from the photographing position thereof relative to the first lens group moving ring 15 to prevent barrier blades of a lens barrier unit 30 (see FIG. 8) and the first lens group L1 from interfering with each other when the zoom lens barrel 10 is fully retracted as shown in FIG. 3. More specifically, as shown in FIG. 16, the shapes of the first cam grooves C15 and the third cam grooves C16 are determined so that the distance Q in the optical axis direction between the first cam grooves C15 and the third cam grooves C16 in the preparation ranges (i.e., the range between the retracted position and the position at which the lens barrier unit 30 is fully open) is longer than that of the zoom ranges (i.e., the range between the wide-angle extremity and the telephoto extremity). Namely, throughout the entirety of the preparation ranges the distance Q=Q1, however, the distance Q gradually reduces from a position OP2 at a predetermined distance from a fully opened position OP1 of the lens barrier unit 30 (i.e., from a position whereby the first lens group L1 and the lens barrier unit 30 do not interfere with each other), so that the distance Q=Q2 (<Q1) at the wide-angle extremity, and the distance Q=Q2 in the entirety of the zoom ranges.

It can be seen in FIG. 3 that a clearance c1 between the flange wall 15Z of the first lens group moving ring 15 and a flange wall 16f of the exterior ring 16 when the zoom lens barrel 10 is in the retracted position is greater than that when the zoom lens barrel 10 is in a ready-to-photograph position as shown in FIG. 4 or 5. In other words, when the zoom lens barrel 10 is in a ready-to-photograph position as shown in FIG. 4 or 5, the flange wall 15Z of the first lens group moving ring 15 and the flange wall 16f of the exterior ring 16 are positioned closely to each other to reduce the length of the zoom lens barrel 10. The lens barrier unit 30 is supported by the exterior ring 16 at the front end thereof. The zoom lens barrel 10 is provided, immediately behind the lens barrier unit 30 (between the lens barrier unit 30 and the flange wall 16f of the exterior ring 16), with a barrier opening/closing ring 31 (see FIG. 9). Rotating the barrier opening/closing ring 31 at the retracted position via rotation of the cam/helicoid ring 12 causes the barrier blades of the lens barrier unit 30 to open and shut. The mechanism for opening and closing the barrier blades using a barrier opening/closing ring such as the barrier opening/closing ring 31 is known in the art. Note that in the illustrated embodiment, although the shapes of the first cam grooves C15 and the third cam grooves C16 are determined so that the distance Q (i.e., Q2) is constant (unchanging) over the entire zoom range, the distance Q (i.e., Q2) can be determined so as to change in accordance with the focal length. Furthermore, the distance Q2 over the zoom range can be determined so as to be greater than the distance Q1 over the preparation range.

The front end of each third cam groove C16 is open on a front end surface of the cam/helicoid ring 12 to be formed as an open end C16a (see FIG. 16) through which the associated cam follower 16b of the exterior ring 16 is inserted into the third cam groove C16. Likewise, the front end of each first cam groove C15 is open on a front end surface of the cam/helicoid ring 12 to be formed as an open end C15a (see FIG. 16) through which the associated cam follower 15a of the first lens group moving ring 15 is inserted into the first cam groove C15.

Figure 6:
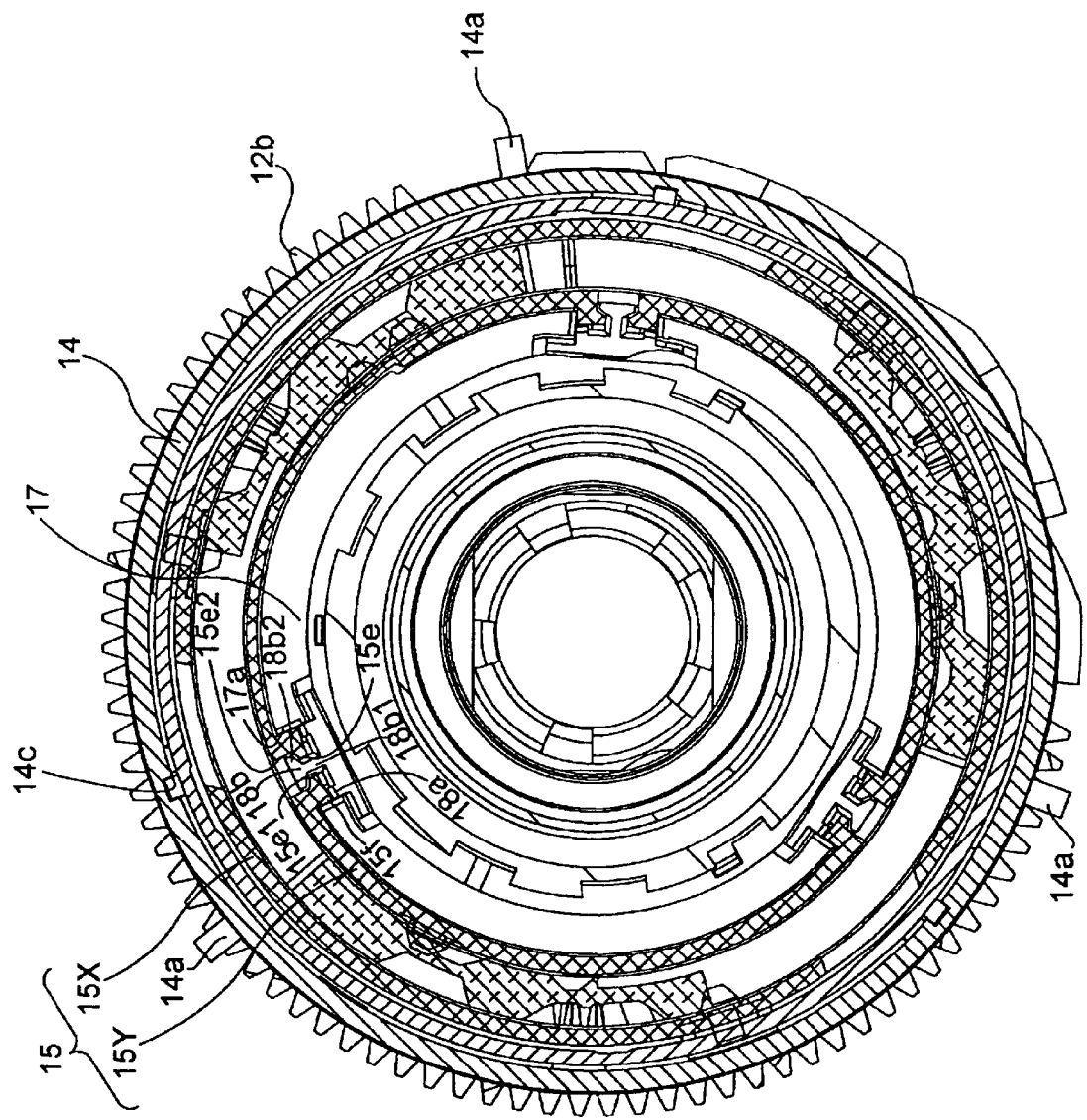
FIG. 6 is a transverse cross sectional view taken along VI—VI line shown in FIG. 3.
Figure 7:
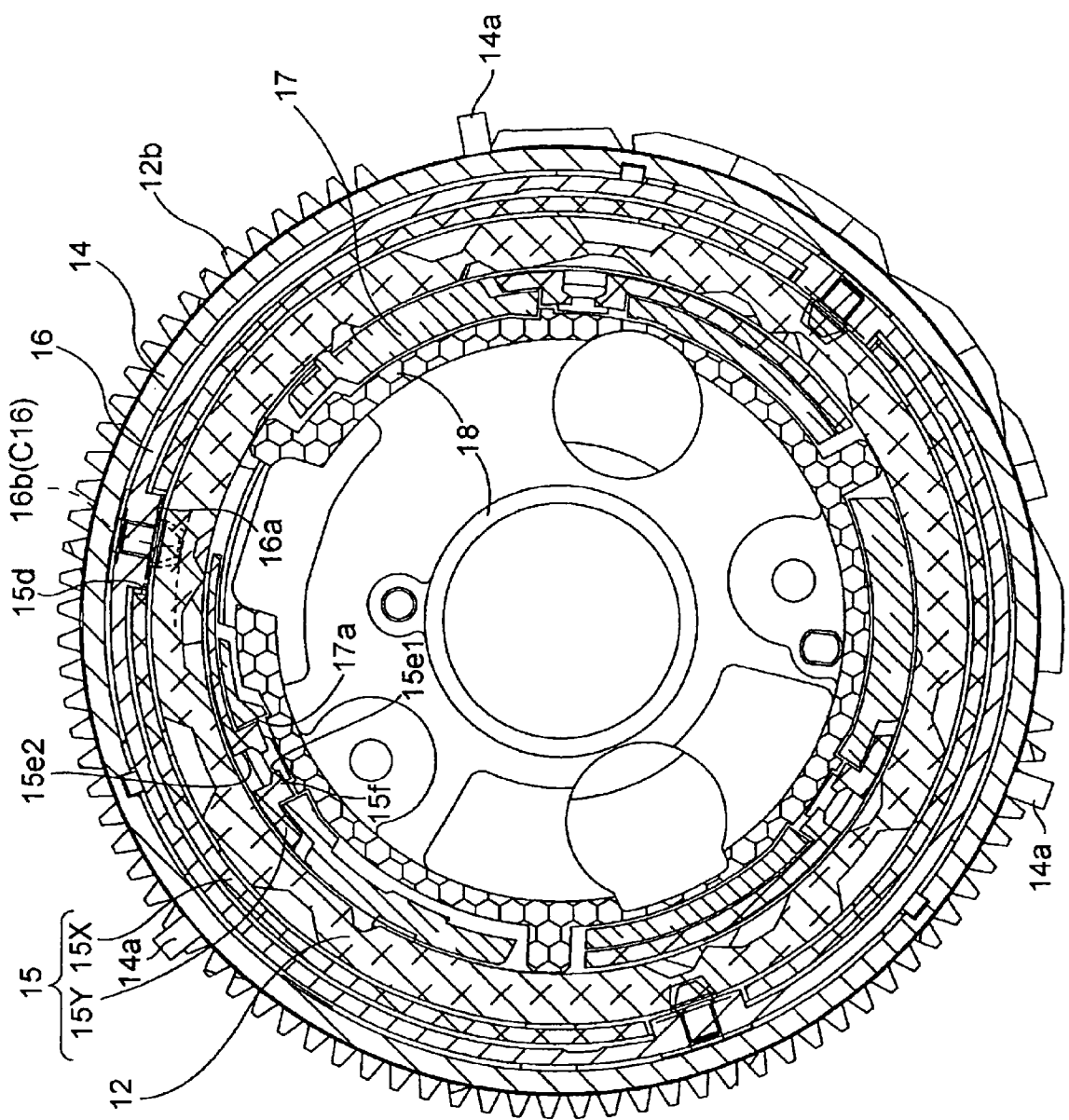
FIG. 7 is a transverse cross sectional view taken along VII—VII line shown in FIG. 3.
Figure 17:
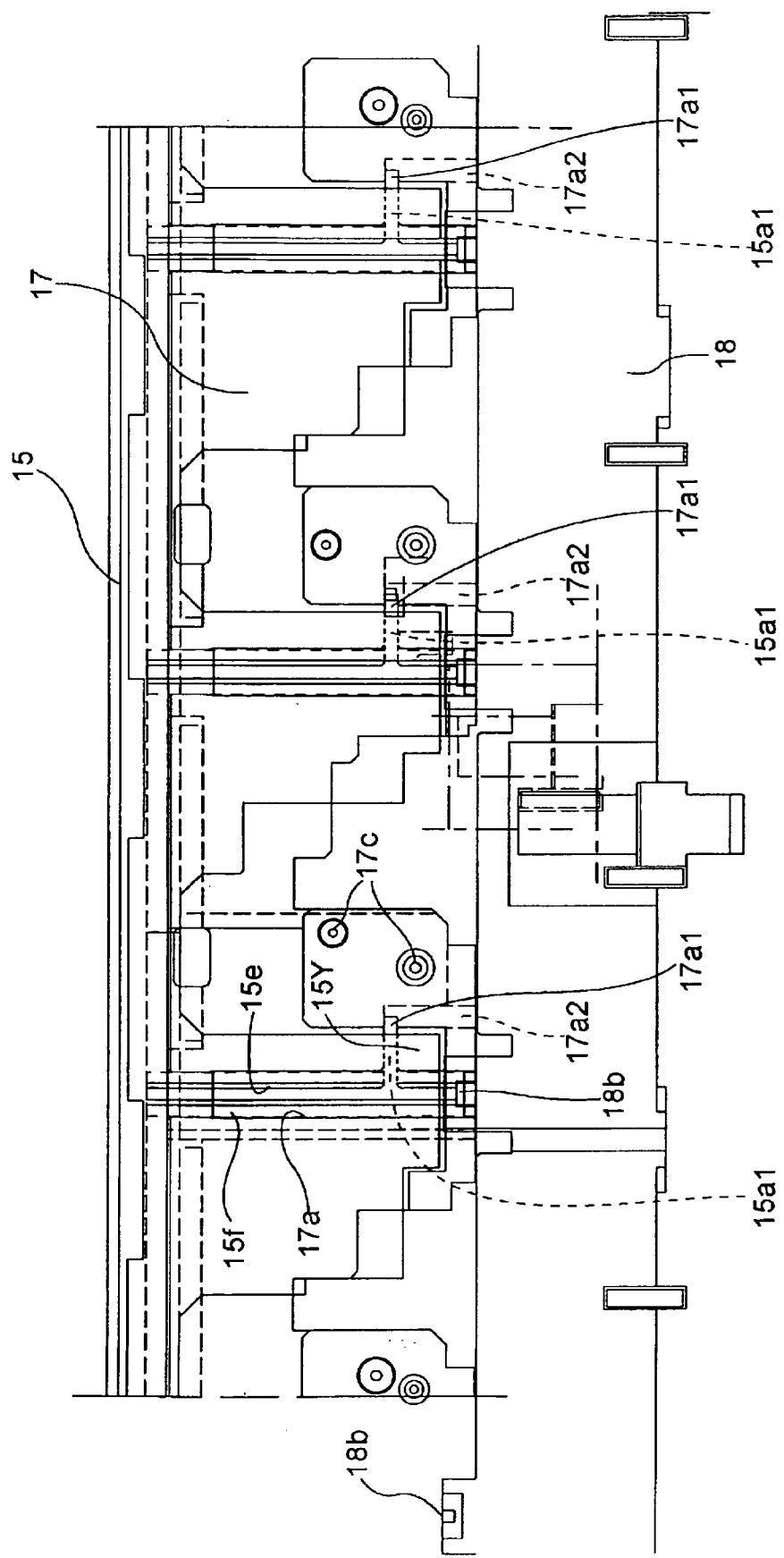
FIG. 17 is a developed view of the first lens group moving ring, the second lens group moving ring and the third lens group moving ring, showing linear guide mechanical linkages among the first through third lens group moving rings.

The inner ring portion 15Y of the first lens group moving ring 15 is provided on an inner peripheral surface thereof with a set of three linear guide projections 15f which are elongated in a direction parallel to the optical axis O, while the second lens group moving ring 17 is provided with a set of three linear guide slots (linear guide through-slots) 17a which are elongated in a direction parallel to the optical axis O to be engaged with the set of three linear guide projections 15f to be freely slidable relative thereto along the optical axis O (see FIGS. 6, 7 and 17). Each linear guide projection 15f is provided along a substantially center thereof with a hanging groove 15e which is elongated in a direction parallel to the optical axis O and which has a substantially T-shaped cross section as shown in FIG. 6. The three linear guide projections 15f and the three linear guide slots 17a constitute a first linear guide mechanism. The rear end of each hanging groove 15e is closed (see FIGS. 17 and 18). The second lens group moving ring 17 is provided on an outer peripheral surface thereof with six cam followers 17c which are engaged in the set of six second cam grooves C17 of the cam/helicoid ring 12, respectively.

Figure 11:
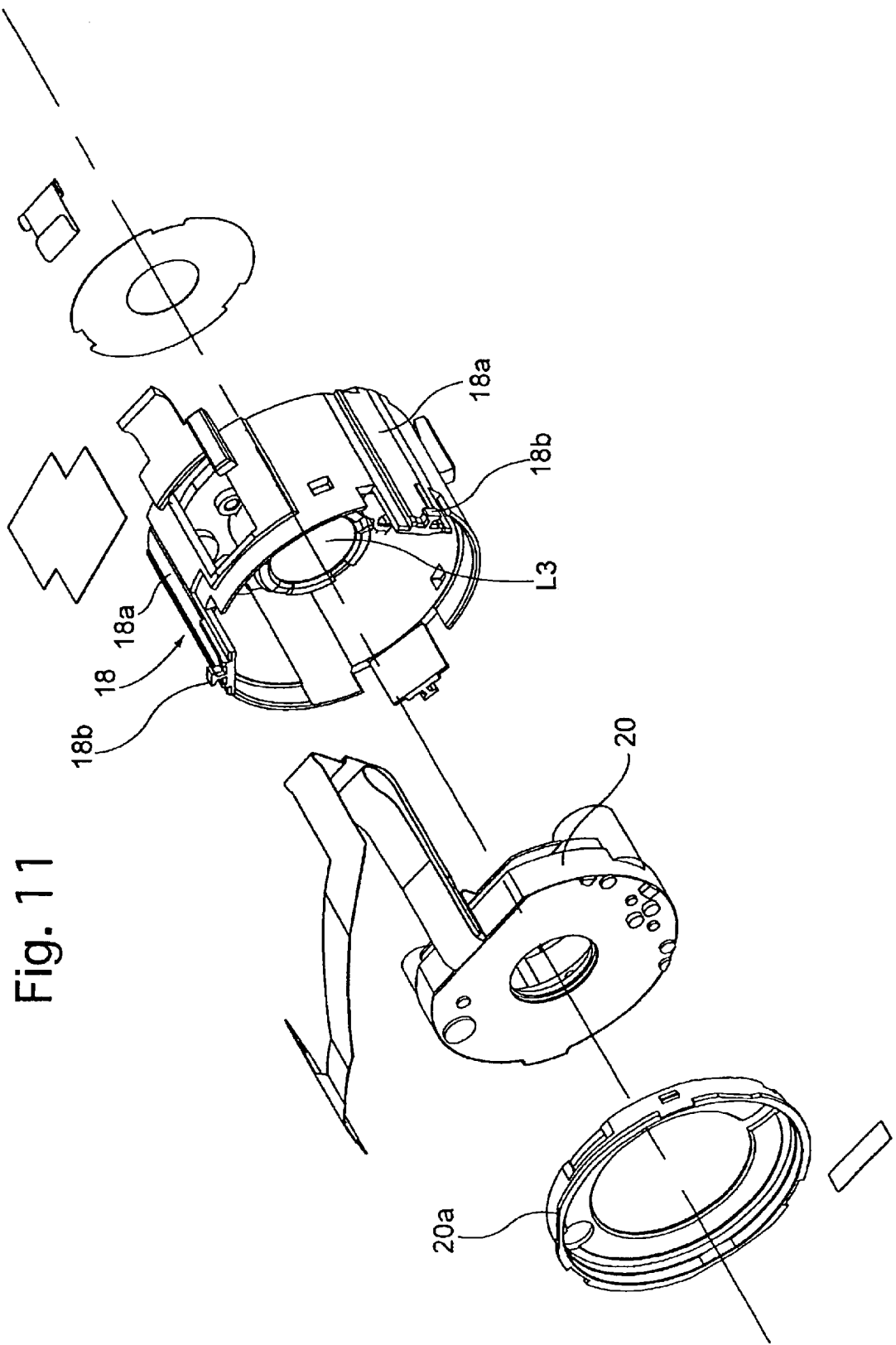
FIG. 11 is an exploded perspective view of a portion of the zoom lens barrel shown in FIG. 3, showing a third lens group moving ring and peripheral elements.

The zoom lens barrel 10 is provided inside the second lens group moving ring 17 with a third lens group moving ring (third lens frame) 18 which supports the third lens group L3. The third lens group moving ring 18 is provided on an outer peripheral surface thereof with a set of three linear guide projections 18a which are elongated in a direction parallel to the optical axis O to be engaged in the set of three linear guide slots 17a of the second lens group moving ring 17 to be freely slidable relative thereto along the optical axis O, respectively. The third lens group moving ring 18 is provided on a center of each linear guide projection 18a at the front end thereof with a linear moving key (stop projection) 18b (see FIGS. 11, 17 and 18) which has a substantially T-shaped cross section to be engaged in the associated hanging groove 15e. The three linear guide projections 15f, the three hanging groove 15e and the three linear moving keys 18b constitute a second linear guide mechanism. Furthermore, the three linear guide slots 17a and the three linear guide projections 18a constitute a third linear guide mechanism. As shown in FIG. 11, the zoom lens barrel 10 is provided with a shutter unit 20 which is inserted into the third lens group moving ring 18 to be positioned in front of the third lens group L3. The shutter unit 20 is fixed to the third lens group moving ring 18 by a fixing ring 20a. The zoom lens barrel 10 is provided between the third lens group moving ring 18 (the fixing ring 20a) and the second lens group moving ring 17 with a compression coil spring 21 which continuously biases the third lens group moving ring 18 rearwards relative to the second lens group moving ring 17. The rear limit of this rearward movement of the third lens group moving ring 18 relative to the second lens group moving ring 17 is determined by the three linear moving keys 18b contacting the closed rear ends of the three hanging grooves 15e, respectively. Namely, when the zoom lens barrel 10 is in a ready-to-photograph position, each linear moving key 18b remains in contact with the rear end of the associated hanging groove 15e of the first lens group moving ring 15 to keep the distance between the first lens group L1 and the third lens group L3 constant. When the zoom lens barrel 10 changes from a ready-to-photograph state to the retracted state shown in FIG. 3, a further rearward movement of the first lens group L1 in accordance with contours of the set of three first cam grooves C15, after the third lens group L3 (the third lens group moving ring 18) has reached the mechanical rear moving limit thereof, causes the first lens group L1 to approach the third lens group L3 while compressing the compression coil spring 21 (see FIG. 1). Each linear moving key 18b is formed so that the radially outer end thereof bulges to be prevented from coming off the associated hanging groove 15e.

Figure 12:
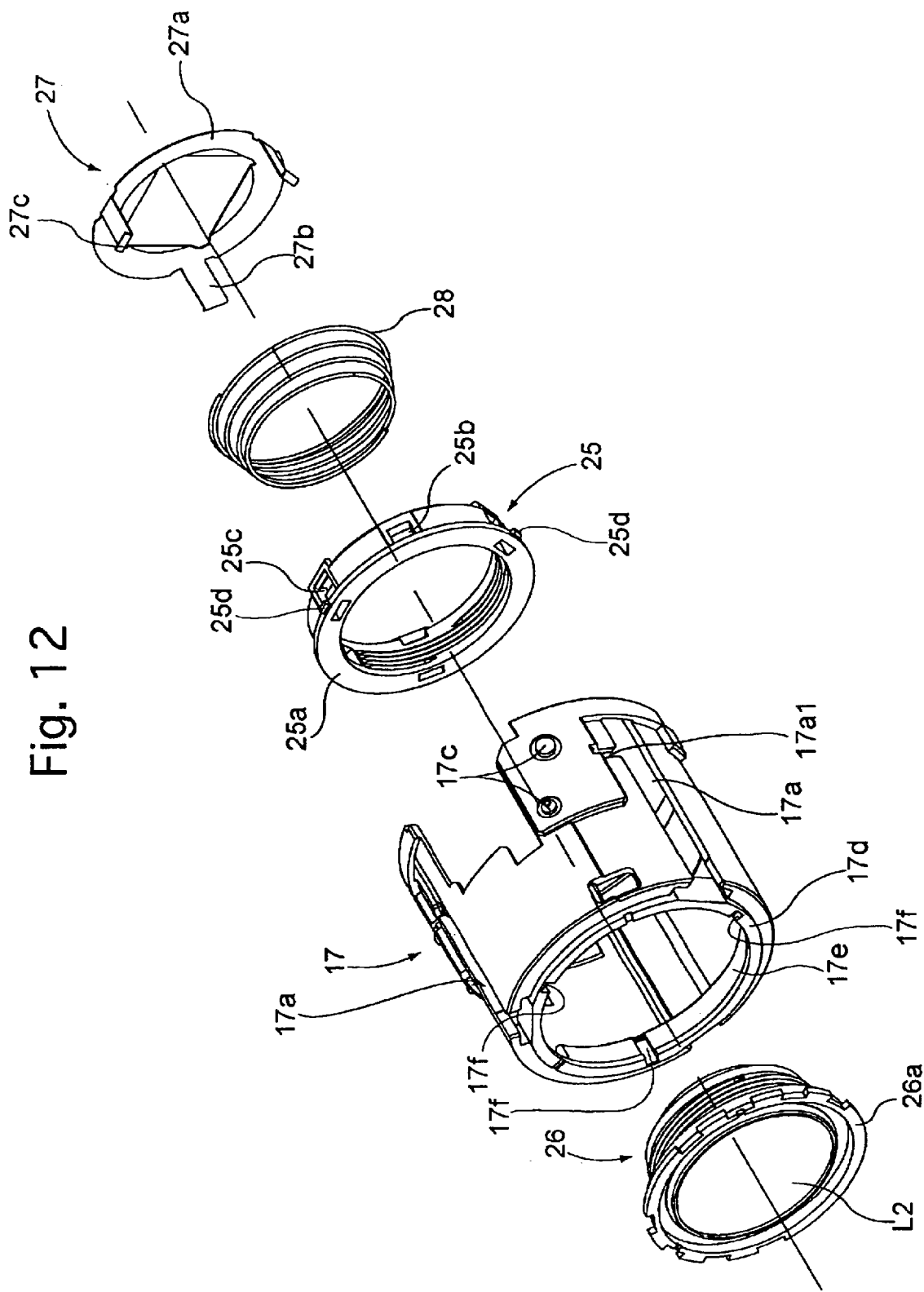
FIG. 12 is an exploded perspective view of a portion of the zoom lens barrel shown in FIG. 3, showing a second lens group moving ring and peripheral elements.
Figure 13:
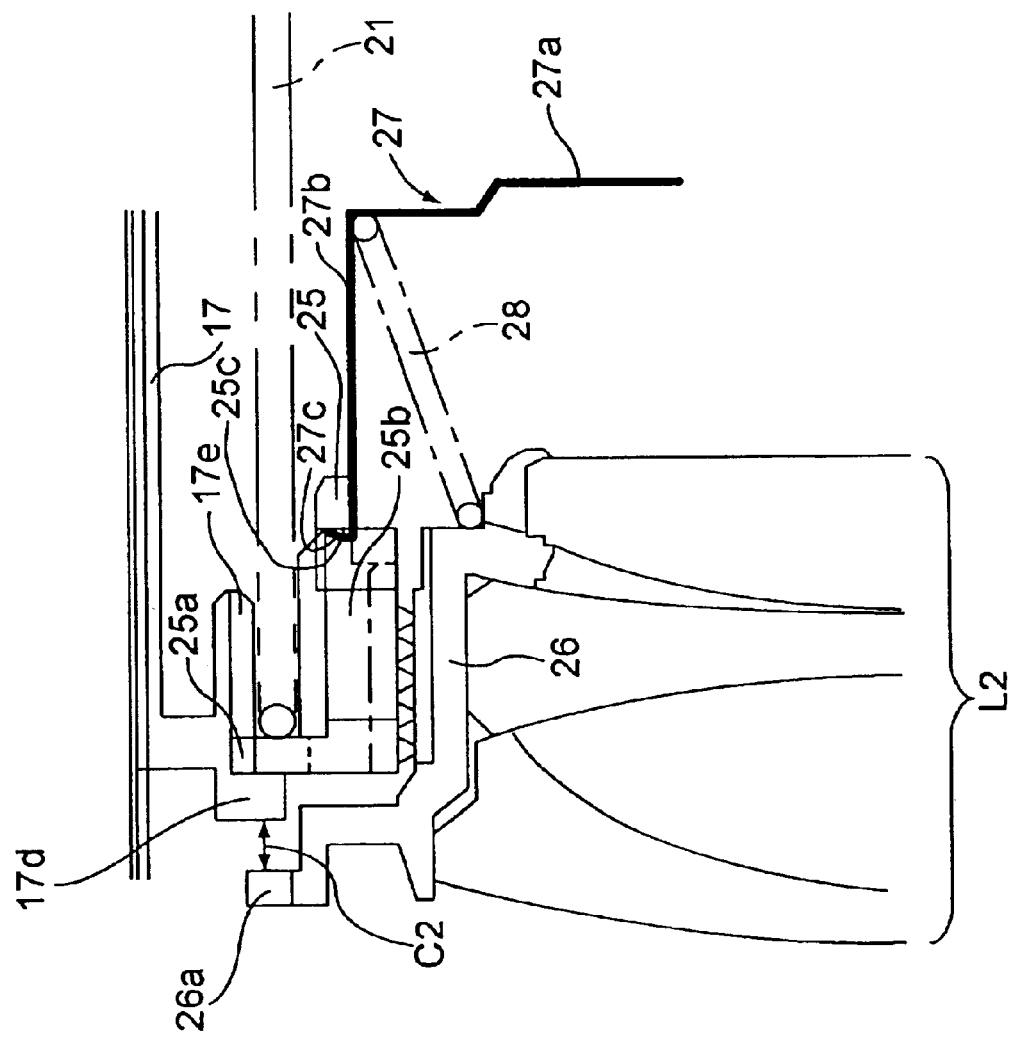
FIG. 13 is a longitudinal view of a portion of the zoom lens barrel shown in FIG. 3, showing a portion of the second lens group moving ring and peripheral elements.
Figure 14:
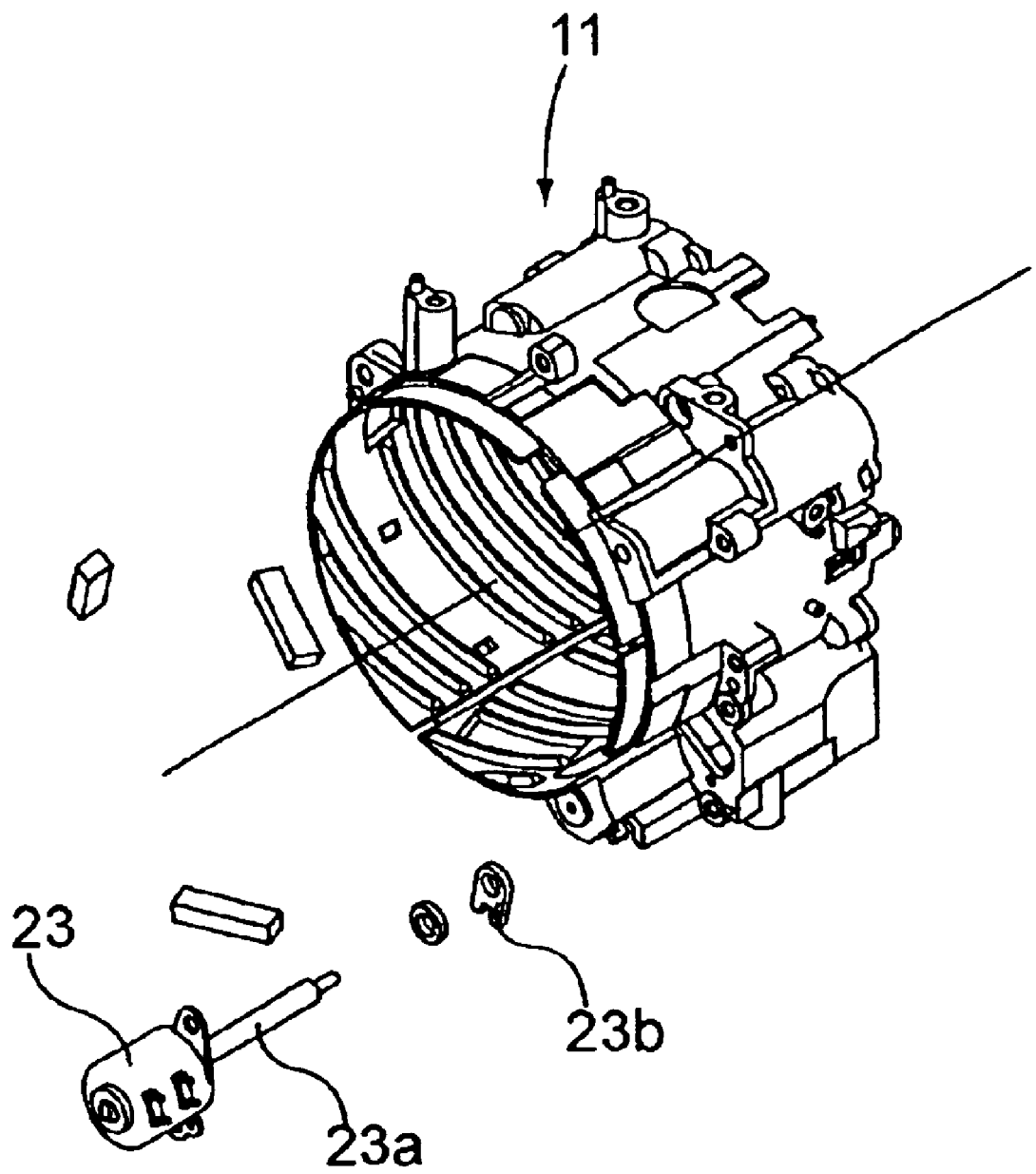
FIG. 14 is an exploded perspective view of a portion of the zoom lens barrel shown in FIG. 3, showing a stationary barrel, a pulse motor supported by the stationary barrel, and peripheral elements, seen from the rear side thereof.

Although a biasing force of the compression coil spring 21 can be applied directly to the second lens group moving ring 17 (i.e., although the second lens group L2 can be fixed to the second lens group moving ring 17), the second lens group L2 is made to be capable of moving rearward relative to the second lens group moving ring 17 for the purpose of further reduction in length of the zoom lens barrel 10 in the retracted state thereof in the present embodiment of the zoom lens barrel. FIGS. 12 and 13 show this structure for the further reduction in length of the zoom lens barrel 10. The second lens group moving ring 17 is provided at the front end thereof with a cylindrical portion 17e having an inner flange 17d. Three linear guide grooves 17f, which extend parallel to the optical axis direction and open at the front and rear ends thereof, are formed at equi-angular intervals on the cylindrical portion 17e. The zoom lens barrel 10 is provided inside the second lens group moving ring 17 with an intermediate ring (intermediate member) 25. The intermediate ring 25 is provided at the front end thereof with a flange portion 25a which is fitted in the cylindrical portion 17e to be freely slidable on the cylindrical portion 17e in the optical axis direction. An end portion of the compression coil spring 21 abuts against the flange portion 25a, so that the flange portion 25a presses against the inner flange 17d due to the resiliency of the compression coil spring 21. Three guide projections 25d which radially extend outwards are provided on the outer peripheral surface of the flange portion 25a. The three guide projection 25d are respectively engaged with the three linear guide grooves 17f of the second lens group moving ring 17 from the rear side of the second lens group moving ring 17. Accordingly, the intermediate ring 25 is prevented from rotating about the optical axis with respect to the second lens group moving ring 17, and can only relatively move in the optical axis direction. The front face of the flange portion 25a can move forwards until sliding contact is made with the rear face of the inner flange 17d. The zoom lens barrel L2 is provided inside the second lens group moving ring 17 with a second lens group support frame 26 to which the second lens group L2 is fixed. A male thread 26b of the second lens group support frame 26 is screwed into female thread 25e formed on the inner periphery of the intermediate ring 25. Accordingly, the position of the second lens group L2 relative to the intermediate ring 25 which is prevented from rotating about the optical axis can be adjusted in the optical axis direction (zooming adjustment) by rotating the second lens group support frame 26 relative to the intermediate ring 25. After this adjustment, the second lens group support frame 26 can be permanently fixed to the intermediate ring 25 by putting drops of an adhesive agent into a radial through hole 25b formed on the intermediate ring 25. The second lens group support frame 26 is provided on an outer peripheral surface thereof with an outer flange 26a, and a clearance C2 (see FIG. 13) for the zooming adjustment exits between a front end surface of the inner flange 17d and the outer flange 26a. The compression coil spring 21 biases the intermediate ring 25 forward, and the intermediate ring 25 is held at a position where the flange portion 25a contacts with the inner flange 17d when the zoom lens barrel 10 is in a ready-to-photograph state. Namely, on the one hand, the position of the second lens group L2 is controlled by the set of six second cam grooves C17 when the zoom lens barrel 10 is in a ready-to-photograph state; on the other hand, the second lens group support frame 26 is pushed rearward mechanically by the rear end of the first lens group support frame 24 to thereby move the outer flange 26a of the second lens group support frame 26 rearward to a point where the outer flange 26a contacts with the inner flange 17d when the zoom lens barrel 10 is retracted to the retracted position thereof. This reduces the length of the zoom lens barrel 10 by a length corresponding to the clearance C2.

The zoom lens barrel 10 is provided immediately behind the intermediate ring 25 with a light shield ring 27 which is supported by the intermediate ring 25. As shown in FIG. 12, the light shield ring 27 is provided with a ring portion 27a and a set of three leg portions 27b which extend forward from the ring portion 27a at intervals of approximately 120 degrees. Each leg portion 27b is provided at the front end thereof with a hook portion 27c which is formed by bending the tip of the leg portion 27b radially outwards. The intermediate ring 25 is provided on an outer peripheral surface thereof with a set of three engaging holes 25c with which the hook portions 27c of the set of three leg portions 27b are engaged, respectively (see FIG. 12). The zoom lens barrel 10 is provided between the light shield ring 27 and the second lens group support frame 26 with a compression coil spring 28 having a substantially truncated conical shape which continuously biases the light shield ring 27 rearwards. When the zoom lens barrel 10 is retracted toward the retracted position, the light shield ring 27 approaches the second lens group support frame 26 while compressing the compression coil spring 28 after reaching the rear moving limit of the light shield ring 27. The lengths of the set of three engaging holes 25c in the optical axis direction are determined to allow the ring portion 27a to come into contact with the second lens group support frame 26.

The compression coil spring 28 also serves as a device for removing backlash between the intermediate ring 25 and the second lens group support frame 26 when the second lens group support frame 26 is rotated relative to the intermediate ring 25 for the aforementioned zooming adjustment. The zooming adjustment is performed by rotating the second lens group support frame 26 relative to the intermediate ring 25 to adjust the position of the second lens group L2 in the optical axis direction relative to the intermediate ring 25 while viewing the position of an object image. This zooming adjustment can be performed with precision with backlash between the intermediate ring 25 and the second lens group support frame 26 being removed by the compression coil spring 28.

The zoom lens barrel 10 is provided behind the third lens group moving ring 18 with a fourth lens group support frame 22 to which the fourth lens group L4 is fixed. As described above, the fourth lens group L4 is moved to make a slight focus adjustment to the vari-focal lens system to adjust a slight focal deviation thereof while the first through third lens groups L1, L2 and L3 are moved relative to one another to vary the focal length of the zoom lens system, and is also moved as a focusing lens group. The fourth lens group L4 is moved along the optical axis O by rotation of a pulse motor 23 (see FIGS. 5 and 14). The pulse motor 23 is provided with a rotary screw shaft 23a. A nut member 23b is screwed on the rotary screw shaft 23a to be prevented from rotating relative to the stationary barrel 11. The nut member 23b is continuously biased by an extension coil spring S in a direction to contact with a leg portion 22a which projects radially outwards from the fourth lens group support frame 22 (see FIGS. 5 and 15). The fourth lens group support frame 22 is prevented from rotating by guide bars 22b, which extend in direction parallel to the optical axis direction, which are slidably engaged with radial projecting followers 22c which extend radially outwards from the fourth lens group support frame 22 (see FIGS. 2 and 15). Accordingly, rotations of the pulse motor 23 forward and reverse cause the fourth lens group support frame 22 (the fourth lens group L4) to move forward and rearward along the optical axis O, respectively. Rotations of the pulse motor 23 are controlled in accordance with information on focal length and/or information on object distance.

Accordingly, in the above described embodiment of the zoom lens barrel, rotating the cam/helicoid ring 12 by rotation of the drive pinion 13 causes the first lens group moving ring 15, the exterior ring 16 and the second lens group moving ring 17 to move along the optical axis O in accordance with contours of the set of three first cam grooves C15, the set of three third cam grooves C16 and the set of six second cam grooves C17, respectively. When the first lens group moving ring 15 moves forward from the retracted position, firstly the three linear moving keys 18b contact the rear ends of the three hanging grooves 15e, respectively, and subsequently the third lens group moving ring 18 moves together with the first lens group moving ring 15 with the three linear moving key 18b remaining in contact with the rear ends of the three hanging grooves 15e, respectively. The position of the fourth lens group L4 is controlled by the pulse motor 23, whose rotations are controlled in accordance with information on focal length, to make a slight focus adjustment to the vari-focal lens system to adjust a slight focal deviation thereof. As a result, reference moving paths as shown in FIG. 1 for performing a zooming operation are obtained. Rotations of the pulse motor 23 are also controlled in accordance with information on object distance to perform a focusing operation.

As described above, the present embodiment of the zoom lens barrel includes the first lens group L1, the second lens group L2, the third lens group L3 and the fourth lens group L4, in that order from the object side. The first through third lens groups L1 through L3 are moved along the optical axis O to vary the focal length of the zoom lens system. During this variation of focal length, the first lens group L1 and the third lens group L3 are integrally moved (i.e., with a constant distance therebetween) along the optical axis O. In addition, the three cam followers 15a of the first lens group moving ring 15, which is positioned around the cam/helicoid ring 12 and supports the first lens group L1, are respectively engaged in the set of three first cam grooves C15 of the cam/helicoid ring 12, while the six cam followers 17c of the second lens group moving ring 17, which is positioned inside the cam/helicoid ring 12 and supports the second lens group L2, are respectively engaged in the set of six second cam grooves C17 of the cam/helicoid ring 12. The three cam followers 15a, the three first cam grooves C15, the six cam followers 17c and the six second cam grooves C17 are elements of the cam mechanism of the zoom lens barrel 10 to which the present invention is applied.

In addition, the first lens group moving ring 15 is linearly guided along the optical axis O by the engagement of the set of three linear guide projections 15b, which project radially outwards from the outer ring portion 15X of the first lens group moving ring 15, with the set of three linear guide grooves 14c of the linear guide ring 14, which is linearly guided along the optical axis O by the stationary barrel 11.

The second lens group moving ring 17 is linearly guided along the optical axis O by the engagement of the set of three linear guide projections 15f, which project radially inwards from the inner ring portion 15Y of the first lens group moving ring 15, with the set of three linear guide slots 17a of the second lens group moving ring 17.

The third lens group moving ring 18 is linearly guided along the optical axis O by the second lens group moving ring 17; specifically, by the engagement of the set of three linear guide projections 18a of the third lens group moving ring 18 with the set of three linear guide slots 17a of the second lens group moving ring 17. Additionally, the third lens group moving ring 18 is linearly guided along the optical axis O by the first lens group moving ring 15 by the engagement of the set of three linear moving keys (stop projections) 18b, each of which projects radially outwards from the front end of the associated linear guide projection 18a, with the set of three hanging grooves 15e, each of which is formed on the associated linear guide projection 15f. Namely, opposite edges of each linear guide projection 15f of the inner ring portion 15Y guide the second lens group moving ring 17 linearly along the optical axis O via the set of three linear guide slots 17a, while a central portion of each linear guide projection 15f (i.e., each hanging groove 15e) guides the third lens group moving ring 18 linearly along the optical axis O. This structure miniaturizes the linear guide mechanism for guiding the second lens group moving ring 17 and the third lens group moving ring 18 by effectively using three peripheral surfaces of each linear guide projection 15f. In addition, each linear guide slot 17a is formed to be slidably fitted on opposite side edges of the associated linear guide projection 15f and opposite side edges of the associated linear guide projections 18a so that the radial thickness of each linear guide projection 15f and the radial thickness of the associated linear guide projection 18a are substantially accommodated within the wall thickness of the second lens group moving ring 17. This structure makes it possible to increase the strength of the zoom lens barrel so that each of the second lens group moving ring 17 and the third lens group moving ring 18 can be reliably guided linearly along the optical axis O without requiring an increase in diameter of the zoom lens barrel 10. Moreover, the zoom lens barrel 10 has been miniaturized to be smaller than a conventional similar zoom lens barrel due to the above described structure wherein the outer ring portion 15X of the first lens group moving ring 15 is linearly guided along the optical axis O by the linear guide ring 14 while each of the second lens group moving ring 17 and the third lens group moving ring 18 is linearly guided along the optical axis O by the inner ring portion 15Y of the first lens group moving ring 15. Accordingly, since the third lens group moving ring 18 is linearly guided along the optical axis O by two members: the first lens group moving ring 15 and the second lens group moving ring 17, the third lens group moving ring 18 can be linearly guided with stability even if an excessive load is applied to either the first lens group moving ring 15 or the second lens group moving ring 17, while the third lens group moving ring 18 is prevented from coming off the zoom lens barrel 10 even if an excessive load is applied to the third lens group moving ring 18.

In addition, as shown in FIG. 6, each hanging groove 15e is provided with a narrow-width groove portion 15e1 and a wide-width groove portion 15e2 whose width in a circumferential direction of the first lens group moving ring 15 is greater than that of the narrow-width groove portion 15e1. Each linear moving key 18b is provided with a neck portion 18b1 which is engaged in the associated narrow-width groove portion 15e1, and a head portion 18b2 which bulges to have a width greater than the width of the neck portion 18b1 in the circumferential direction of the first lens group moving ring 15 and which is fixed at the radially outer end of the neck portion 18b1 to be engaged in the wide-width groove portion 15e2. Since the head portion 18b2 of each linear moving key 18b is not only engaged in the wide-width groove portion 15e2 of the associated hanging groove 15e, to prevent the neck portion 18b1 from being disengaged from the narrow-width groove portion 15e1 of the associated hanging groove 15e, but also is linearly guided by the wide-width groove portion 15e2 of the associated hanging groove 15e, the third lens group moving ring 18 is linearly guided along the optical axis O with stability via the first lens group moving ring 15.

The rear end of each hanging groove 15e is closed, and the distance between the first lens group moving ring 15 and the third lens group moving ring 18 becomes maximum when the three linear moving keys 18b contact with the closed rear ends of the three hanging grooves 15e, respectively. In addition, the compression coil spring (biasing device) 21, which biases the second lens group moving ring 17 (the first lens group moving ring 15) and the third lens group moving ring 18 in opposite directions away from each other, is installed in a compressed fashion between the intermediate ring 25 and the third lens group moving ring 18.

Additionally, in the above illustrated embodiment of the zoom lens barrel, the third lens group moving ring 18 is linearly guided along the optical axis O by the first lens group moving ring 15 and the second lens group moving ring 17, and also each linear moving key 18b and the associated hanging groove 15e are formed to have special (corresponding) shapes, making it easy for the zoom lens barrel 10 to be assembled.

Figure 18:
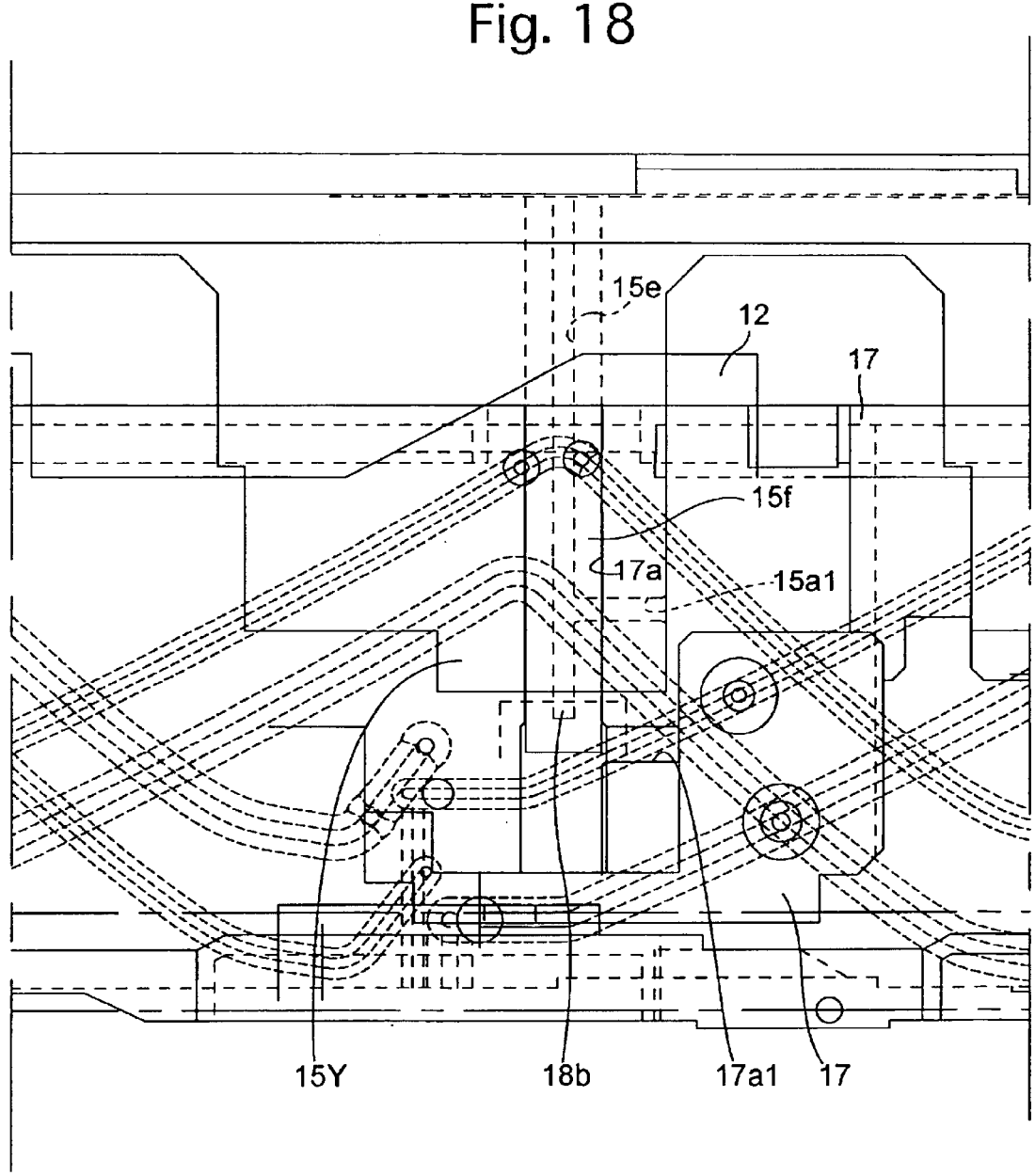
FIG. 18 is an enlarged view of a portion of the developed view shown in FIG. 17.
Figure 19:
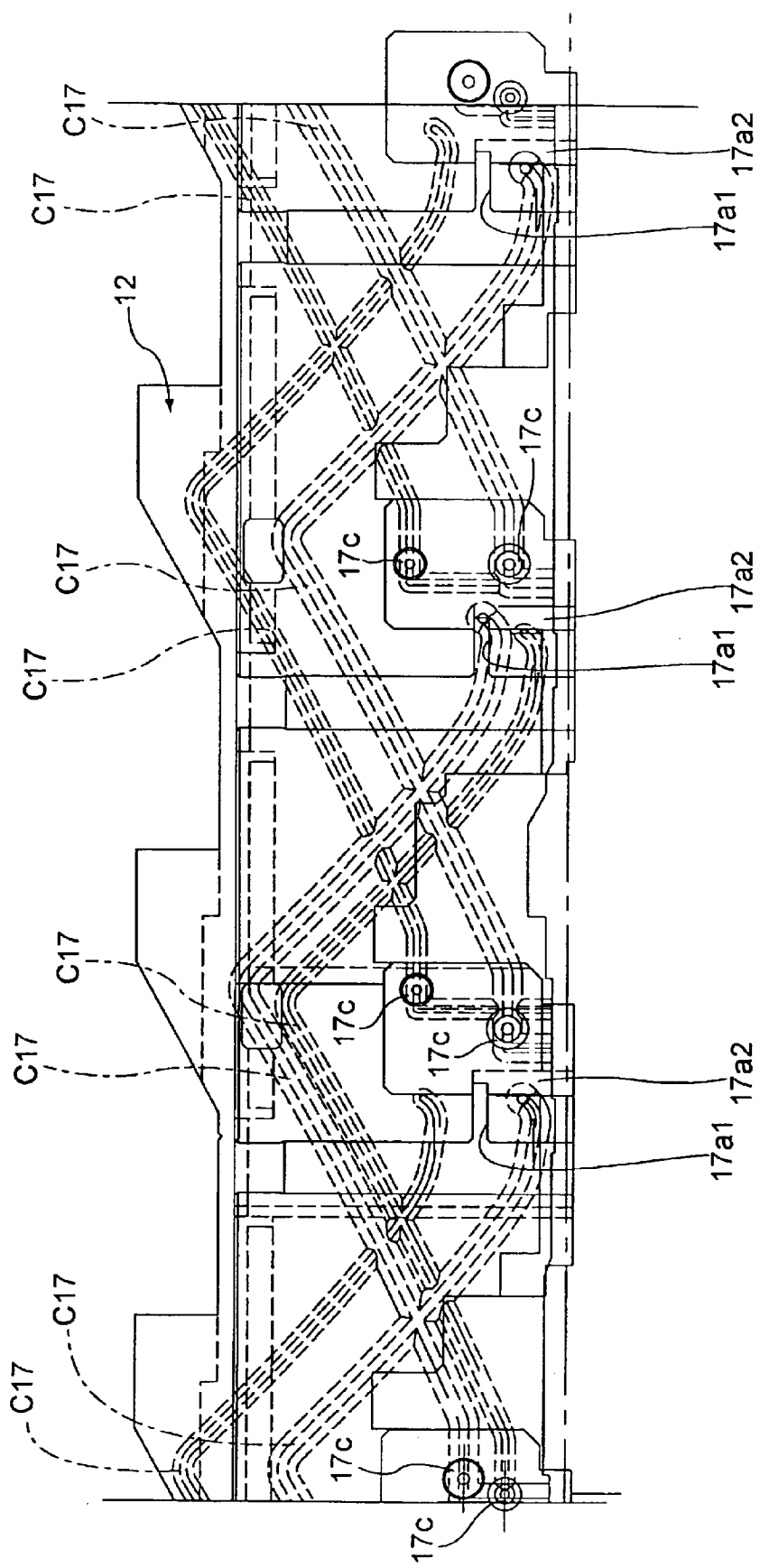
FIG. 19 is a developed view of the cam/helicoid ring, showing the shapes of a set of second cam grooves of the cam/helicoid ring for moving the second lens group.

As shown in FIGS. 17 through 19, the second lens group moving ring 17 is provided with a set of three follower introducing through-slots 17a1 which extend orthogonal to the set of three linear guide slots 17a to communicatively connect with the set of three linear guide slots 17a, respectively. The second lens group moving ring 17 is provided on an inner peripheral surface thereof with a set of three follower introducing grooves (bottomed grooves) 17a2 which extend parallel to the optical axis O to communicate with the set of three follower introducing through-slots 17a1. Specifically, the front end of each follower introducing groove 17a2 communicatively connected with the associated follower introducing through-slot 17a1, and the rear end of each follower introducing groove 17a2 is open on a rear surface of the second lens group moving ring 17. The inner ring portion 15Y is provided on an inner peripheral surface thereof with a set of three follower introducing grooves (bottomed grooves) 15a1 which are formed to be associated with the three hanging grooves 15e, respectively. More specifically, each follower introducing groove 15a1 is formed on an inner peripheral surface of the inner ring portion 15Y so as to extend through a side wall of the associated linear guide projection 15f (which extends parallel to the optical axis O) to extend between the hanging groove 15e of the associated linear guide projection 15f and the outside thereof in a circumferential direction of the inner ring portion 15Y. The length of each follower introducing grooves 15a1 and the length of each follower introducing through-slot 17a1 in the circumferential direction of the inner ring portion 15Y are greater than that of the head portion 18b2 of the associated linear moving key 18b.

When the third lens group moving ring 18 is installed in the zoom lens barrel 10 during assembly, firstly the positions of the first lens group moving ring 15 and the second lens group moving ring 17 in the optical axis direction are adjusted by rotating the cam/helicoid ring 12 to make the three follower introducing grooves 15a1 and the three follower introducing through-slots 17a1 aligned in the optical axis direction (see FIG. 17) so that the three follower introducing grooves 15a1, the three follower introducing through-slots 17a1 and the three follower introducing grooves 17a2 form three L-shaped follower introducing channels, respectively. Subsequently, in a state where each head portion 18b2 of each linear moving key 18b is aligned with each associated follower introducing groove 17a2 in the optical axis direction, respectively, the third lens group moving ring 18 is inserted from its front end into the rear end of the second lens group moving ring 17 so that each head portion 18b2 of each linear moving key 18b is engaged in the associated follower introducing groove 17a2 of the linear guide slot 17a. Subsequently, if the third lens group moving ring 18 is further inserted into the second lens group moving ring 17, each head portion 18b2 reaches the junction between the associated follower introducing groove 17a2 and the associated follower introducing through-slot 17a1 through the associated follower introducing groove 17a2. In this state where each head portion 18b2 is positioned at the junction between the associated follower introducing groove 17a2 and the associated follower introducing through-slot 17a1, a rotation of the third lens group moving ring 18 relative to the second lens group moving ring 17 in a predetermined rotational direction causes each linear moving key 18b to rotate in the circumferential direction of the inner ring portion 15Y to move into the hanging groove 15e of the associated linear guide projection 15f via the associated follower introducing through-slot 17a1 and the associated follower introducing groove 15a1 so that the neck portion 18b1 and the head portion 18b2 of the associated linear moving key 18b are engaged in the narrow-width groove portion 15e1 and the wide-width groove portion 15e2 of the associated hanging groove 15e, respectively. In this state, if the cam/helicoid ring 12 is rotated so that the three follower introducing grooves 15a1 and the three follower introducing through-slots 17a1 are not aligned in the optical axis direction, the set of three linear moving keys 18b cannot rotate about the optical axis O relative to the first lens group moving ring 15. This completes the installation of the third lens group moving ring 18. It should be noted that each linear moving key 18b is not disengaged from the associated hanging groove 15e through the associated follower introducing through-slot 17a1 and the introducing groove 15a1 to thereby prevent the third lens group moving ring 18 from coming off the zoom lens barrel 10 when the zoom lens barrel 10 is in a ready-to-photograph position or the retracted position because the three follower introducing grooves 15a1 and the three follower introducing through-slots 17a1 are not aligned in the optical axis direction.

The zoom lens barrel which has been discussed above with reference to FIGS. 1 through 19 is just an example to which a retracting mechanism devised according to the present invention is applied. The present invention can be applied not only to a zoom lens barrel such as the above described zoom lens barrel 10, but also to any other zoom lens including a cam ring and a lens support ring, regardless of whether the cam ring includes a helicoid such as the male helicoid 12a of the cam/helicoid ring 12.

As can be understood from the foregoing, according to the present invention, a retracting mechanism of a zoom lens barrel including a zoom lens system in which the first lens group and the third lens group are moved together as one body along an optical axis during a variation of a focal length, wherein the retracting mechanism can be easily assembled and further wherein each of the first, second and third lens groups can be linearly guided with reliability, is achieved.

Obvious changes may be made in the specific embodiment of the present invention described herein, such modifications being within the spirit and scope of the invention claimed. It is indicated that all matter contained herein is illustrative and does not limit the scope of the present invention.

What is claimed is:

1. A retracting mechanism of a zoom lens barrel including a first lens group, a second lens group and a third lens group, in that order from an object side, wherein said first lens group and said third lens group are integrally moved along an optical axis thereof during a zooming operation, and wherein at least one of said first lens group and said third lens group is moved relative to the other to reduce a distance therebetween when said zoom lens barrel is retracted, said retracting mechanism comprising:

a first lens group moving ring which is linearly guided along said optical axis, and supports said first lens group;

a second lens group moving ring which is linearly guided along said optical axis, and supports said second lens group;

a third lens group moving ring which is linearly guided along said optical axis, and supports said third lens group, said third lens group moving ring being allowed to freely approach said first lens group moving ring while being prevented from moving away from said first lens group moving ring beyond a moving limit relative to said first lens group moving ring;

a cam mechanism for moving said first lens group moving ring and said second lens group moving ring in respective moving manners independent of each other along said optical axis;

a biasing device for biasing said third lens group moving ring in a direction away from said first lens group moving ring;

a linear guide through-slot formed on said second lens group moving ring to be elongated in a direction parallel to said optical axis;

a first linear guide projection formed on said first lens group moving ring to be engaged in said linear guide through-slot from outside said second lens group moving ring, said first linear guide projection including a hanging groove formed along a substantially center thereof and elongated in a direction parallel to said optical axis, a rear end of said hanging groove being closed;

a second linear guide projection formed on said third lens group moving ring to be engaged in said linear guide through-slot from inside said second lens group moving ring; and a linear moving key projecting from a front end of said second linear guide projection to be engaged in said hanging groove, wherein a rear moving limit of said third lens group moving ring relative to said first lens group moving ring is determined by contact of said linear moving key with said closed rear end of said hanging groove.

2. The retracting mechanism according to claim 1, wherein said hanging groove comprises:

a narrow-width groove portion which communicatively connects with said linear guide through-slot; and a wide-width groove portion which communicative connects with said narrow-width groove portion, a width of said wide-width groove portion in a circumferential direction of said first lens group moving ring being greater than that of said narrow-width groove portion, wherein said linear moving key comprises:

a neck portion which is engaged in said narrow-width groove portion; and a head portion which is engaged in said wide-width groove portion, a width of said head portion in a circumferential direction of said first lens group moving ring being greater than that of said neck portion.

3. The retracting mechanism according to claim 1, wherein said second lens group moving ring comprises:

a follower introducing through-slot which extends orthogonal to said linear guide through-slot to communicatively connect with said linear through-guide slot; and a first follower introducing groove which extends parallel to said optical axis to communicative connect with said follower introducing through-slot, a front end of said first follower introducing groove communicatively connecting with said follower introducing through-slot, a rear end of said first follower introducing groove being open on a rear surface of said second lens group moving ring, wherein said first lens group moving ring comprises a second follower introducing groove which radially communicatively connects with said follower introducing through-slot and said hanging groove when said first lens group moving ring is positioned at a specific position relative to said second lens group moving ring in said optical axis direction, and wherein said linear moving key is inserted into said hanging groove via said follower introducing through-slot, said first follower introducing groove and said second follower introducing groove during assembly of said zoom lens barrel.

4. The retracting mechanism according to claim 1, wherein said first lens group moving ring, said second lens group moving ring and said third lens group moving ring are coaxially arranged so that said first lens group moving ring is positioned around said second lens group moving ring, and so that said second lens group moving ring is positioned around said third lens group moving ring.

5. The retracting mechanism according to claim 1, wherein said cam mechanism comprises:
- a cam ring which is positioned around said second lens group moving ring to be rotatable relative to said second lens group moving ring, and includes a plurality of outer cam grooves formed on an outer peripheral surface of said cam ring, and a plurality of inner cam grooves formed on an inner peripheral surface of said cam ring;
- a plurality of inward cam followers which project radially inwards from said first lens group moving ring to be engaged in said plurality of outer cam grooves, respectively; and
- a plurality of outward cam followers which project radially outwards from said second lens group moving ring to be engaged in said plurality of inner cam grooves, respectively.

6. The retracting mechanism according to claim 1, wherein said biasing device comprises a compression coil spring.

7. The retracting mechanism according to claim 5, positions of said first lens group moving ring and said second lens group moving ring in said optical axis direction are adjusted by rotating said cam ring to make said second follower introducing groove and said follower introducing through-slot aligned in said optical axis direction so that said second follower introducing grooves, said follower introducing through-slots and said first follower introducing grooves form an L-shaped follower introducing channel, through which said linear moving key is inserted into said hanging groove, when said third lens group moving ring is installed in said zoom lens barrel during assembly.

* * * * *